(12) United States Patent
Musa et al.

(10) Patent No.: US 11,069,989 B2
(45) Date of Patent: Jul. 20, 2021

(54) METHOD AND APPARATUS FOR MULTI-MODE MULTI-LEVEL TRANSMITTER

(71) Applicant: HUAWEI TECHNOLOGIES CO., LTD., Guangdong (CN)

(72) Inventors: Faisal Ahmed Musa, Kanata (CA); Euhan Chong, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 16/511,200

(22) Filed: Jul. 15, 2019

(65) Prior Publication Data

US 2021/0021056 A1    Jan. 21, 2021

(51) Int. Cl.
*H01Q 25/04* (2006.01)
*H01Q 5/30* (2015.01)
*H01Q 23/00* (2006.01)

(52) U.S. Cl.
CPC .............. *H01Q 25/04* (2013.01); *H01Q 5/30* (2015.01); *H01Q 23/00* (2013.01)

(58) Field of Classification Search
CPC ............ H01L 25/0272; H01L 25/0278; H01L 25/03885; H03K 17/102; H03K 19/018571; H03M 9/00; H04L 25/0272; H04L 25/0278; H04L 25/03885; H01Q 5/30; H01Q 23/00; H01Q 25/04
See application file for complete search history.

(56) References Cited

U.S. PATENT DOCUMENTS

| | | | |
|---|---|---|---|
| 2004/0028164 A1* | 2/2004 | Jiang | H04L 12/46 375/371 |
| 2012/0187980 A1* | 7/2012 | Kurahashi | H03K 19/018514 326/86 |
| 2016/0254932 A1* | 9/2016 | Chong | H04L 27/01 375/233 |
| 2018/0159703 A1* | 6/2018 | Chattopadhyay | H04L 25/0286 |
| 2020/0106649 A1* | 4/2020 | Peng | H03F 3/45237 |

OTHER PUBLICATIONS

Sredojevic et al., Fully Digital Transmit Equalizer With Dynamic Impedance Modulation, IEEE Journal of Solid-State Circuits, Aug. 2011, pp. 1857-1869, vol. 46, No. 8.
Updated Filing Receipt of U.S. Appl. No. 15/976,545, filed May 10, 2018.

* cited by examiner

*Primary Examiner* — Tung X Le
(74) *Attorney, Agent, or Firm* — BCF LLP

(57) ABSTRACT

The disclosed systems, structures, and methods are directed to a multi-level multi-mode transmitter, employing a first pre-driver configured to receive M-parallel data streams and to convert the M-parallel data streams into a serial data stream, a first voltage-driver configured to operate on the single data stream and to provide a voltage in accordance with the single data stream, a second pre-driver configured to receive and process the M-parallel data streams in accordance with at least one of the following modes: moderate impedance (Z) post-cursor mode, moderate Z pre-cursor mode, low Z high-swing mode, low Z post-cursor mode, and low Z pre-cursor mode, and convert the processed M-parallel data streams into a first serial stream and a second serial stream and a second voltage-driver configured to operate on the first serial stream and the second serial stream and to provide a voltage.

39 Claims, 19 Drawing Sheets

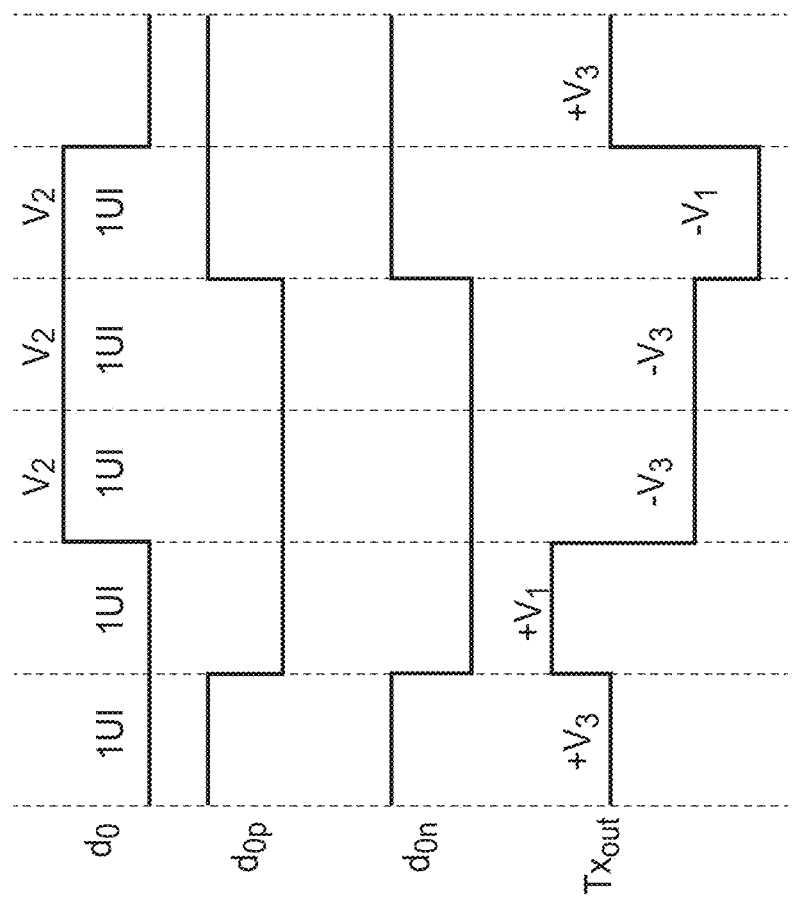

METHOD AND APPARATUS FOR MULTI-MODE MULTI-LEVEL TRANSMITTER

CROSS-REFERENCE TO RELATED APPLICATIONS

This is the first application filed for the instantly disclosed technology.

FIELD OF THE INVENTION

The present disclosure generally relates to the field of communication networks and, in particular, to a multi-mode multi-level transmitter.

BACKGROUND

Wireline serial transmitters, such as, for example, serializers are ubiquitous in communication networks, as they operate to connect the processing cores of integrated circuits (ICs) with other elements. In so doing, transmitters are configured to perform numerous tasks, including channel equalization, clock and data recovery, serialization of the input data etc. Further, modern communication transmitters may employ voltage mode transmitters to achieve a wider voltage swing and a larger voltage boost on the transmitted data stream.

Certain transmitters receive data in the form of parallel data streams consisting of words having a number of bits. In the present disclosure, the expression "M-lanes" is used to refer to M-parallel data streams. Transmitters receive M-lanes of data stream, provide a delay of one unit interval (UI) to each lane of data stream, multiplex M-lanes of data stream into single high speed stream, and a voltage driver then output the single high speed stream for further operations. The output of the voltage driver is expressed in terms of driver voltage supply, transmitter impedance, and termination impedance.

Since, in modern day nano-CMOS technologies, the driver voltage supply is limited by reliability constraints and also the termination impedance is either mandated by industry standards, typically 50Ω or depends on user's requirements. As such, the only remaining parameter to increase the transmission performance of transmitters in terms of swing, amplitude, signal-to-noise ratio (SNR) etc. is transmitter impedance.

Typically, transmitters are tuned to static impedance in order to provide an efficient impedance matching. Such tunings may be achieved by various methods, such as, for example, an array of programmable on-chip voltage driver slices etc. However, static impedance tuning of transmitters may present certain limits on transmission efficiency of transmitters in various aspects such as output voltage amplitude and voltage swings. As such, static impedance tuning is less effective in combating post cursor and precursor intersymbol interferences caused by the preceding or the following symbol in input data stream.

SUMMARY

An object of the present disclosure is to provide a multi-level multi-mode transmitter. The disclosure presented herein employs a first pre-driver configured to receive M-parallel data streams and to convert the M-parallel data streams into a serial data stream, a first voltage-driver configured to operate on the single data stream and to provide a voltage in accordance with the single data stream, a second pre-driver configured to receive the M-parallel data streams, process the M-parallel data streams in accordance with at least one of the following modes: moderate impedance (Z) post-cursor mode, moderate Z pre-cursor mode, low Z high-swing mode, low Z post-cursor mode, and low Z pre-cursor mode, and convert the processed M-parallel data streams into a first serial stream and a second serial stream and a second voltage-driver configured to operate on the first serial stream and the second serial stream and to provide a voltage in accordance with the first serial stream and the second serial stream.

In accordance with other aspects of the present disclosure the multi-level multi-mode transmitter, wherein the first pre-driver and the first voltage-driver are configured to operate in parallel with the second pre-driver and the second voltage-driver.

In accordance with other aspects of the present disclosure the multi-level multi-mode transmitter, wherein the first pre-driver comprises a first tap delay configured to delay the M-parallel data streams.

In accordance with other aspects of the present disclosure the multi-level multi-mode transmitter, wherein the second pre-driver comprises a second tap-delay configured to delay the M-parallel data streams when operating in moderate Z post-cursor mode, and wherein a delay provided by the first tap delay matches to a delay provided by the second tap delay.

In accordance with other aspects of the present disclosure the multi-level multi-mode transmitter, wherein the second pre-driver further comprises a transition detector configured to detect transitions in delayed M-parallel data streams from low-to-high or from high-to low level and a multiplexer configured to provide first M-parallel streams and second M-parallel streams when operating in moderate Z post-cursor mode.

In accordance with other aspects of the present disclosure the multi-level multi-mode transmitter, wherein the second pre-driver comprises a second tap-delay configured to delay the M-parallel data streams when operating in moderate Z pre-cursor mode, and wherein a delay provided by the first tap delay is one unit more than a delay provided by the second tap-delay.

In accordance with other aspects of the present disclosure the multi-level multi-mode transmitter, wherein the second pre-driver further comprises a transition detector configured to detect the transitions in delayed M-parallel data streams from low-to-high or from high-to low level and to provide a M-parallel streams and second M-parallel streams when operating in moderate Z pre-cursor mode.

In accordance with other aspects of the present disclosure the multi-level multi-mode transmitter, wherein the second pre-driver comprises a second tap-delay configured to delay the M-parallel data streams when operating in low Z post-cursor mode, and wherein a delay provided by the first tap delay is one unit less than a delay provided by the second pre-driver.

In accordance with other aspects of the present disclosure the multi-level multi-mode transmitter, wherein in low Z post-cursor mode the second pre-driver further comprises an inverter configured to invert the delayed M-parallel data streams and to provide first M-parallel streams and second M-parallel streams when operating in low Z post-cursor mode.

In accordance with other aspects of the present disclosure the multi-level multi-mode transmitter, wherein the second pre-driver comprises a second tap-delay configured to delay the M-parallel data streams when operating in low Z pre-cursor mode, and wherein a delay provided by the first tap delay is one unit more than a delay provided by the second tap delay.

In accordance with other aspects of the present disclosure the multi-level multi-mode transmitter, wherein the second pre-driver further comprises an inverter configured to invert the delayed M-parallel data streams and to provide first M-parallel streams and second M-parallel streams when operating in low Z pre-cursor mode.

In accordance with other aspects of the present disclosure the multi-level multi-mode transmitter, further comprising a selector configured to cause the second pre driver to process the M-parallel data streams in accordance with the at least one of the following modes: moderate impedance (Z) post-cursor mode, moderate Z pre-cursor mode, low Z high-swing mode, low Z post-cursor mode, and low Z pre-cursor mode.

In accordance with other aspects of the present disclosure, there is provided a method of multi-level multi-mode transmitter processing. The disclosure presented herein performs receiving M-parallel data streams at a first pre-driver, converting, by the first pre-driver, the M-parallel data streams into a serial data stream, providing, by a first voltage-driver, a voltage in accordance with the serial data stream, receiving the M-parallel data streams at a second pre-driver, processing, by second pre-driver, the M-parallel data streams, in accordance with at least one of the following modes: moderate impedance (Z) post-cursor mode, moderate Z pre-cursor mode, low Z high-swing mode, low Z post-cursor mode, and low Z pre-cursor mode, converting, by the second pre-driver, the processed M-lanes of data stream into a first serial stream and a second serial stream, providing, by a second voltage-driver, a voltage in accordance with the first serial stream and the second serial stream.

In accordance with other aspects of the present disclosure, the method of multi-level multi-mode transmitter processing, further comprising operating the first pre-driver and the first voltage-driver in parallel with the second pre-driver and the second voltage-driver.

In accordance with other aspects of the present disclosure, the method of multi-level multi-mode transmitter processing, further comprising delaying the M-parallel data streams by the first pre-driver.

In accordance with other aspects of the present disclosure, the method of multi-level multi-mode transmitter processing, further comprising delaying the M-parallel data streams when the second pre-driver is in moderate Z post-cursor mode, wherein a delay provided by the first pre-driver matches to a delay provided by the second pre-driver.

In accordance with other aspects of the present disclosure, the method of multi-level multi-mode transmitter processing, further comprising detecting the transitions in delayed M-parallel data streams from low-to-high or from high-to-low level and providing first M-parallel streams and second M-parallel streams when the second pre-driver is in moderate Z post-cursor mode.

In accordance with other aspects of the present disclosure, the method of multi-level multi-mode transmitter processing, further comprising generating the first serial stream and the second serial stream in accordance with the first M-parallel streams and the second M-parallel streams when the second pre-driver is in moderate Z post-cursor mode.

In accordance with other aspects of the present disclosure, the method of multi-level multi-mode transmitter processing, further comprising providing post-cursor data interference compensation when the second pre-driver is in moderate Z post-cursor mode.

In accordance with other aspects of the present disclosure, the method of multi-level multi-mode transmitter processing, further comprising delaying the M-parallel data streams when the second pre-driver is in moderate Z pre-cursor mode, wherein a delay provided by the first pre-driver is one unit more than a delay provided by the second pre-driver.

In accordance with other aspects of the present disclosure, the method of multi-level multi-mode transmitter processing, further comprising detecting the transitions in delayed M-lanes of data stream from low-to-high or from high-to-low level when the second pre-driver is in moderate Z pre-cursor mode and providing first M-parallel streams and second M-parallel streams.

In accordance with other aspects of the present disclosure, the method of multi-level multi-mode transmitter processing, further comprising generating the first serial stream and the second serial stream in accordance with the first M-parallel streams and the second M-parallel streams when the second pre-driver is in moderate Z pre-cursor mode.

In accordance with other aspects of the present disclosure, the method of multi-level multi-mode transmitter processing, further comprising providing pre-cursor data interference compensation when the second pre-driver is in moderate Z pre-cursor mode.

In accordance with other aspects of the present disclosure, the method of multi-level multi-mode transmitter processing, further comprising operating the first pre-driver and the second pre-driver in a similar manner when the second pre-driver is in low Z high-swing mode.

In accordance with other aspects of the present disclosure, the method of multi-level multi-mode transmitter processing, further comprising providing a higher voltage swing when the second pre-driver is in low Z high-swing mode.

In accordance with other aspects of the present disclosure, the method of multi-level multi-mode transmitter processing, wherein in low Z high-swing mode, low Z post-cursor mode, or low Z pre-cursor mode the overall impedance of the multi-level multi-mode transmitter is reduced.

In accordance with other aspects of the present disclosure, the method of multi-level multi-mode transmitter processing, further comprising delaying the M-parallel data streams when the second pre-driver is in low Z post-cursor mode, wherein the delay provided by the first pre-driver is one unit less than the delay provided by the second pre-driver.

In accordance with other aspects of the present disclosure, the method of multi-level multi-mode transmitter processing, further comprising inverting the delayed M-parallel data streams and provides first M-parallel streams and second M-parallel streams when the second pre-driver is in low Z post-cursor mode.

In accordance with other aspects of the present disclosure, the method of multi-level multi-mode transmitter processing, wherein the first M-parallel streams and the second M-parallel streams are similar when the second pre-driver is in low Z post-cursor mode.

In accordance with other aspects of the present disclosure, the method of multi-level multi-mode transmitter processing, further comprising generating the first serial stream and the second serial stream in accordance with the first M-parallel streams and the second M-parallel streams when the second pre-driver is in low Z post-cursor mode.

In accordance with other aspects of the present disclosure, the method of multi-level multi-mode transmitter processing, further comprising providing post-cursor data interference compensation when the second pre-driver is in low Z post-cursor mode.

In accordance with other aspects of the present disclosure, the method of multi-level multi-mode transmitter processing, further comprising providing a multi-level output voltage when the second pre-driver is in low Z post-cursor mode, wherein a ratio of a higher voltage level to a lower voltage level of a same polarity is at least equal to four.

In accordance with other aspects of the present disclosure, the method of multi-level multi-mode transmitter processing, further comprising providing a multi-level output voltage, wherein the ratio of a higher voltage level to a lower voltage level of a same polarity is greater than one when the second pre-driver is in moderate Z post-cursor mode or moderate Z pre-cursor mode.

In accordance with other aspects of the present disclosure, the method of multi-level multi-mode transmitter processing, further comprising delaying the M-parallel streams when the second pre-driver is in low Z pre-cursor mode, wherein a delay provided by the first pre-driver is one unit more than a delay provided by the second pre-driver.

In accordance with other aspects of the present disclosure, the method of multi-level multi-mode transmitter processing, further comprising inverting the delayed M-parallel streams and providing first M-parallel streams and second M-parallel streams when the second pre-driver is in low Z pre-cursor mode.

In accordance with other aspects of the present disclosure, the method of multi-level multi-mode transmitter processing, further comprising generating the first serial stream and the second serial stream in accordance with the first M-parallel streams and the second M-parallel streams when the second pre-driver is in low Z pre-cursor mode.

In accordance with other aspects of the present disclosure, the method of multi-level multi-mode transmitter processing, wherein the first M-lane of stream and the second M-lane of stream are similar when the second pre-driver is in low Z pre-cursor mode.

In accordance with other aspects of the present disclosure, the method of multi-level multi-mode transmitter processing, further comprising providing pre-cursor data interference compensation when the second pre-driver is in low Z pre-cursor mode.

In accordance with other aspects of the present disclosure, the method of multi-level multi-mode transmitter processing, further comprising operating the first voltage driver with same input from the first pre-driver, while operating the second voltage driver with two inputs from the first pre-driver.

BRIEF DESCRIPTION OF THE FIGURES

The features and advantages of the present disclosure will become apparent from the following detailed description, taken in combination with the appended drawings, in which:

FIG. 8B illustrates a representative timing diagram corresponding to functionality of multi-level multi-mode transmitter, operating under low Z pre-cursor mode, in accordance with various embodiments discussed in the present disclosure;

Figure 1:
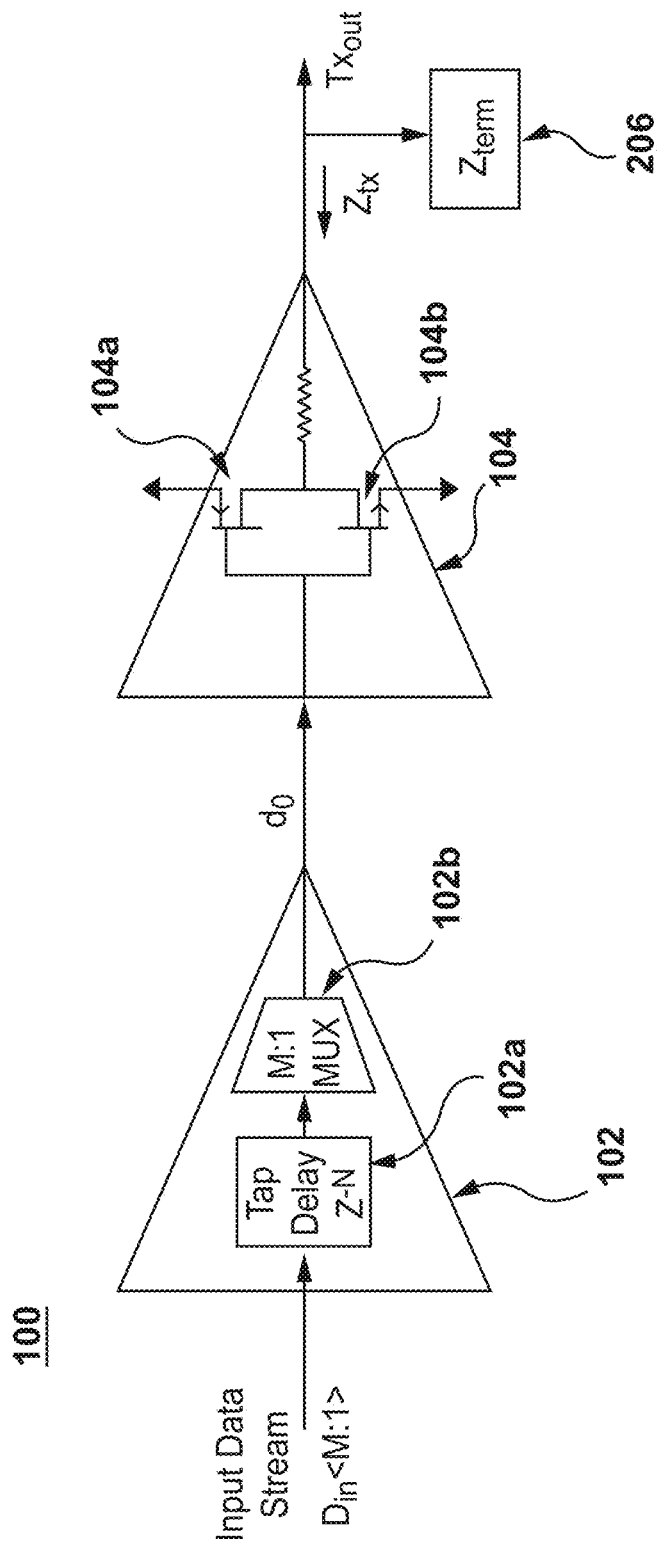
FIG. 1 (Prior Art) depicts a high-level functional block diagram of a conventional multi-lane serial link transmitter.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain to.

FIG. 1(Prior Art) depicts a high-level functional block diagram of a conventional multi-lane serial link transmitter 100 directed to converting M-lanes of data stream into single high speed stream and transmitting the single high speed data stream for further operations. The conventional multi-lane serial link transmitter 100 includes a pre-driver 102, a voltage driver 104, and a termination impedance 106. It will be understood that other elements may be present, but are not illustrated for the purpose of tractability and simplicity.

As shown in FIG. 1, pre-driver 102 further employs a tap delay 102a and a M×1 multiplexer (MUX) 102b. Pre-driver 102 is configured to receive M-lanes of data stream and operate to convert M-lanes of data stream into single high speed data stream $d_0$. Tap delay 102a provides a delay of one UI and supply the delayed M-lanes of data stream to MUX 102b for serial conversion. Further, voltage driver 104 employing a transistor 104a and a transistor 104b provides an output voltage at termination impedance 106 in accordance with data stream $d_0$. Such that the voltage across termination impedance 106 is expressed as:

$$Tx_{out} = v_{dd} \times \frac{z_{term}}{z_{term} + z_{tx}} \quad (1)$$

Where, $z_{term}$ is the termination impedance 106, $z_{tx}$ is the impedance of voltage driver 104 and $v_{dd}$ is the supply voltage to voltage driver 104.

With this said, the conventional multi-lane serial link transmitter 100 with impedance matching i.e. $z_{tx}$ equals to $z_{term}$ provide a maximum voltage $$\frac{v_{dd}}{2}$$

across termination impedance 106. There by, conventional multi-lane serial link transmitter 100 presents certain limits on transmission efficiency of transmitters in various aspects such as output voltage amplitude and voltage swings. Further, conventional multi-lane serial link transmitter 100 also compromises with the transmission efficiency while combating with post cursor and precursor inter-symbol interferences caused by preceding or the following symbol in input data stream.

Figure 2:
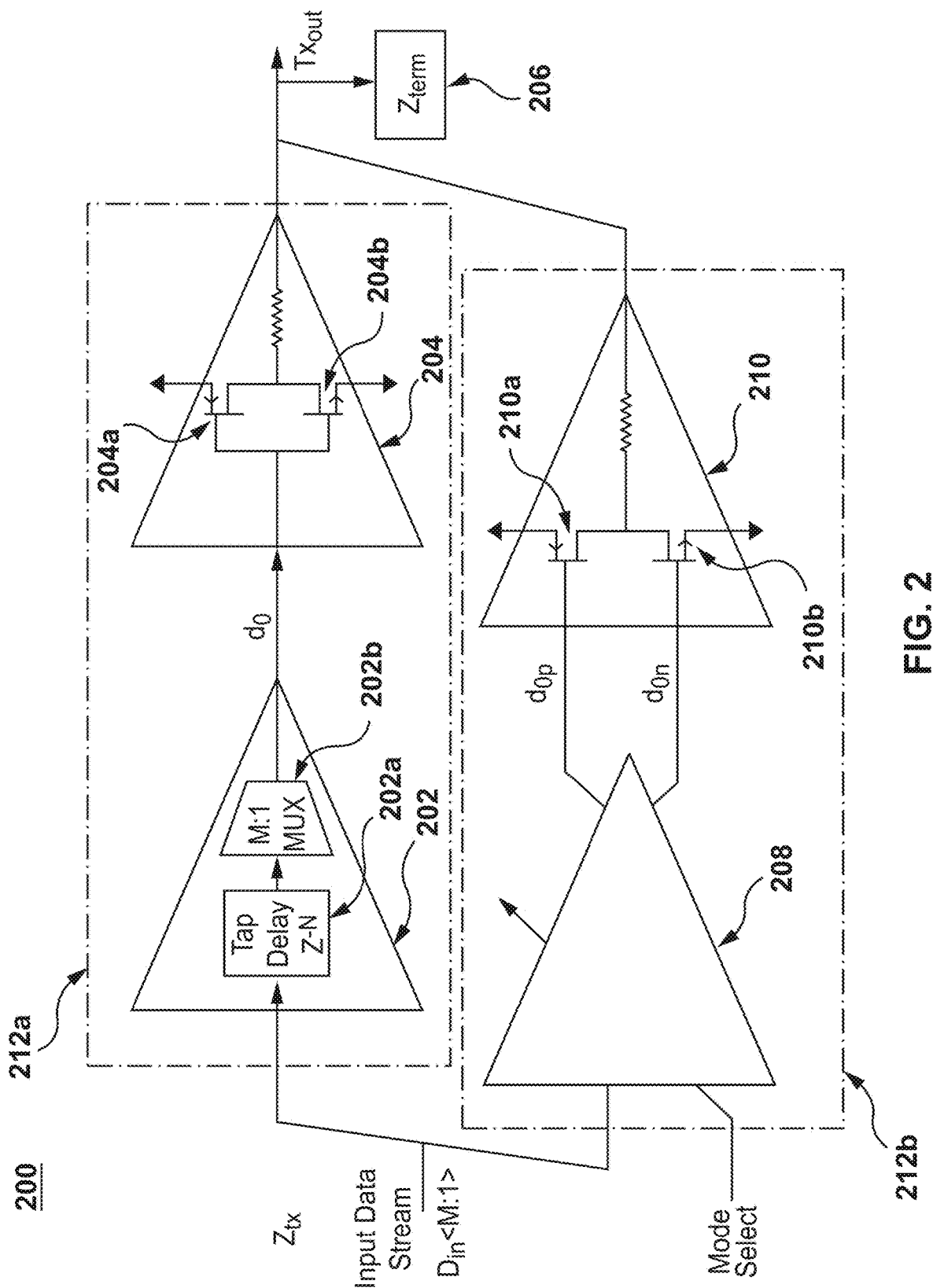
FIG. 2 depicts a high-level functional block diagram of a multi-level multi-mode transmitter, in accordance with various embodiments discussed in the present disclosure.

FIG. 2 depicts a high-level functional block diagram of a multi-level multi-mode transmitter 200, in accordance with various embodiments discussed in the present disclosure. The multi-level multi-mode transmitter 200 includes a first pre-driver 202, a first voltage driver 204, a termination impedance 206, a second pre-driver 208, a second voltage driver 210. As shown, first pre-driver 202 further employs a tap delay 202a and M×1 multiplexer 202b, first voltage driver 204 further employs a transistor 204a and a transistor 204b, and second voltage driver 210 further employs a transistor 210a and a transistor 210b. It will be understood that other elements may be present, but are not illustrated for the purpose of tractability and simplicity.

The multi-level multi-mode transmitter 200 receives M-lanes of data stream and may process M-lanes of data stream in two parallel paths, wherein each parallel path individually process M-lanes of data stream. As such, a first parallel path 212a employing the first pre-driver 202 and the first voltage driver 204 may operate in a conventional manner and the output of the first pre-driver 202 is single data stream $d_0$. However, a second parallel path 212b, employing the second pre-driver 208a nd the second voltage driver 210, may be configured to operate in various modes in accordance with mode select input supplied to the second pre-driver 208 to provide a high output voltage swing as well as combat with post cursor and precursor inter-symbol interferences.

Figure 3:
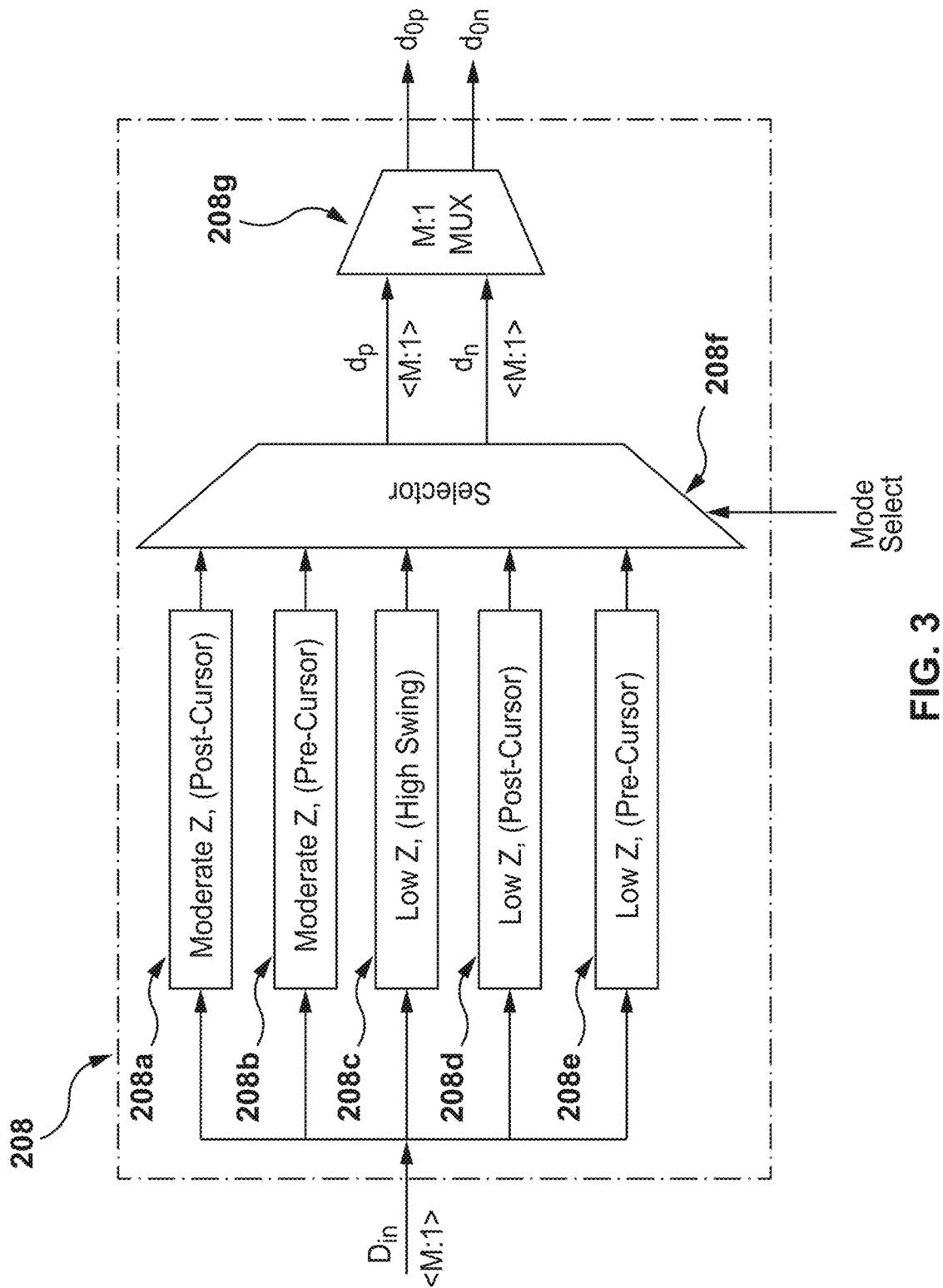
FIG. 3 represents an elaborative high-level functional block diagram of second pre-driver, in accordance with various embodiments discussed in the present disclosure.

To this end, FIG. 3 represents an elaborative high-level functional block diagram of second pre-driver 208, in accordance with various embodiments discussed in the present disclosure. As shown, the second pre-driver 208 further employs a moderate impedance (Z) post-cursor module 208a, a moderate Z pre-cursor module 208b, a low Z high-swing module 208c, a low Z post-cursor module 208d, a low Z pre-cursor module 208e, a selector 208f, and a M×1 multiplexer 208g. It will be understood that other elements may be present, but are not illustrated for the purpose of tractability and simplicity.

In certain embodiment, the moderate Z post-cursor module 208a, moderate Z pre-cursor module 208b, low Z high-swing module 208c, low Z post-cursor module 208d, and low Z pre-cursor module 208e may receive and process M-lanes of data stream $D_{in}$. Further, the selector module 208f may be configured to select one of the modules 208a, 208b, 208c, 208d, or 208e in accordance with a mode select input. The selector module 208f then transfers the processed output of the selected module to the M×1 multiplexer 208g for a parallel to serial conversion of processed M-lanes of data stream $D_{in}$. M×1 multiplexer 208g may be configured to supply the serial converted high speed processed data stream to second voltage driver 210 for further processing.

Figure 4A:
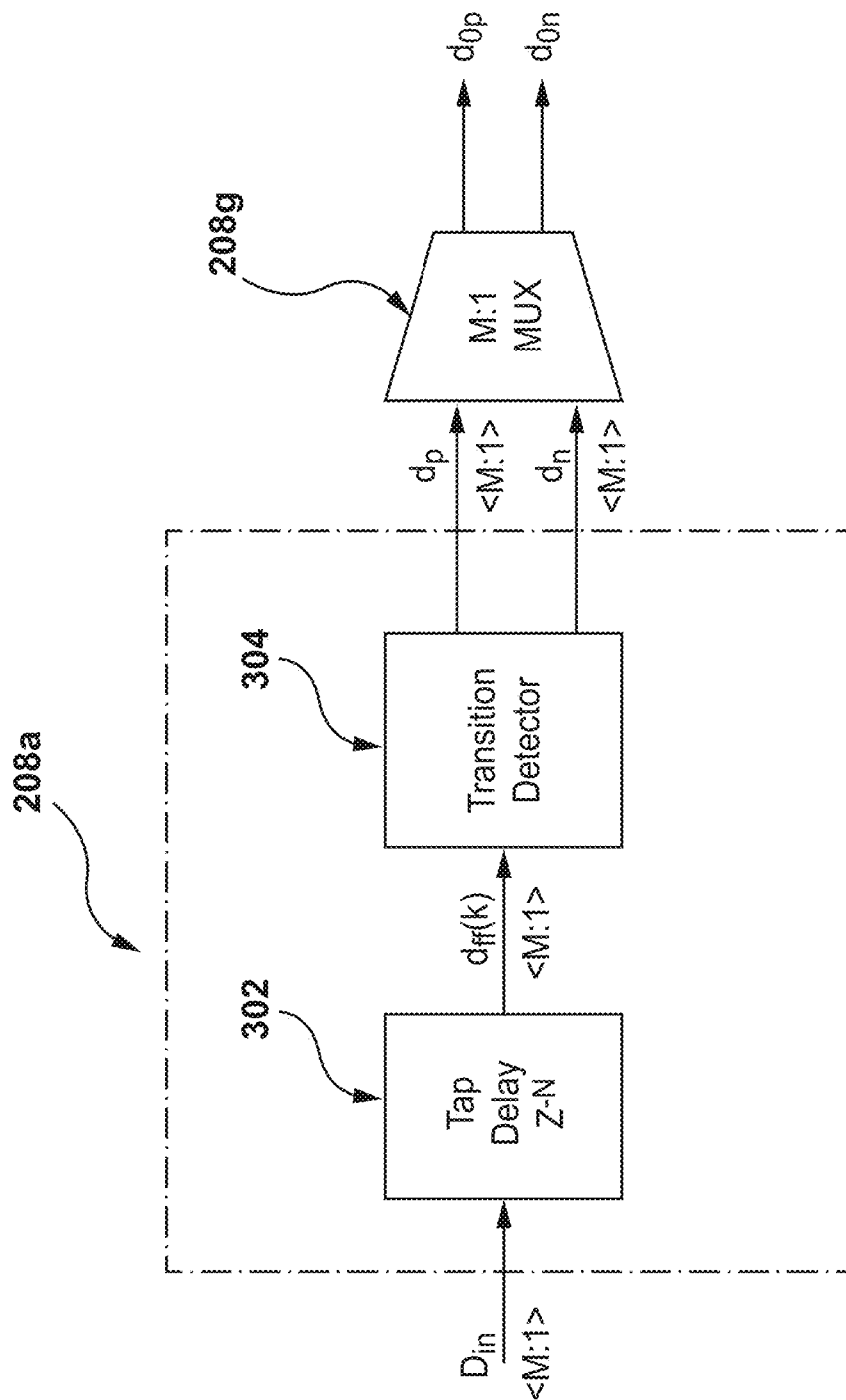
FIG. 4A represents an elaborative high-level functional block diagram of moderate Z post-cursor module, in accordance with various embodiments discussed in the present disclosure.

FIG. 4A represents an elaborative high-level functional block diagram of moderate Z post-cursor module 208a, in accordance with various embodiments discussed in the present disclosure. As shown, moderate Z post-cursor module 208a may further employ a tap delay 302 and a transition detector 304. Tap delay 302 may be configured to delay each data lane by N bit period. The delay provided by tap delay 302 is same delay as provided by tap delay 202a. The M-lanes of delayed data stream $d_{fl}(k)$ are then forwarded to the transition detector 304 where k varies from 1 to M.

Figure 4B:
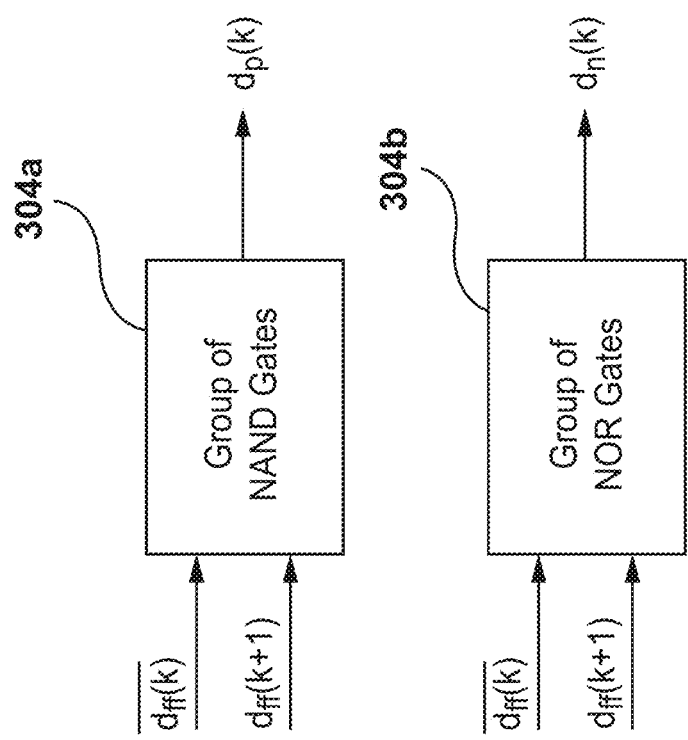
FIG. 4B illustrates a representative high-level functional block diagram of transition detector corresponding to moderate Z post-cursor module, in accordance with various embodiments discussed in the present disclosure.

The transition detector 304 may be configured to detect the transitions from low-to-high voltage level and from high-to-low voltage level in M-lanes of delayed data stream $d_{fl}(k)$. In certain embodiments, transition detector 304 may employ a plurality of logic gates to perform transition detection. To this end, FIG. 4B illustrates a representative high-level functional block diagram of transition detector 304 corresponding to moderate Z post-cursor module 208a, in accordance with various embodiments discussed in the present disclosure. As shown, the transition detector 304 may employ a group of NAND gates 304a and a group of NOR gates 304b.

The group of NAND gates 304a may be configured to detect the high-to-low voltage level transitions in M-lanes of delayed data stream $d_{ff}(k)$. In so doing, the group of NAND gate 304a performs NAND operation on inverted current data bit and next data bit of each lane of data stream in M-lanes of delayed data stream $d_{ff}(k)$. The output of the group of NAND gates 304a is M-lanes of stream $d_p$ such that each lane in M-lanes of stream $d_p$ transits from high-to-low voltage level after there is a transition from high-to-low voltage level in data stream of each lane in M-lanes of delayed data stream $d_{ff}(k)$. Moreover, each lane in M-lanes of stream $d_p$ returns to high state after one unit interval (UI).

Similarly, the group of NOR gates 304b may be configured to detect the low-to-high voltage level transitions in M-lanes of delayed data stream $d_{ff}(k)$. In so doing, the group of NOR gates 304b performs NOR operation on inverted current data bit and next data bit of each lane of data stream in M-lanes of delayed data stream $d_{ff}(k)$. The output of the group of NOR gates 304a is M-lanes of stream $d_n$ such that each lane in M-lanes of stream $d_n$ transits from low-to-high voltage level after there is a transition from low-to-high voltage level in data stream of each lane in M-lanes of delayed data stream $d_{ff}(k)$. Moreover, each lane in M-lanes of stream $d_n$ returns to low state after one unit interval (UI).

Returning to FIG. 4A, the transition detector 304 supplies the M-lanes of stream $d_p$ and M-lanes of stream $d_n$ to M×1 multiplexer 208g. M×1 multiplexer 208g may be configured to convert M-lanes of stream $d_p$ and M-lanes of stream $d_n$ into serial stream $d_{Op}$ and $d_{On}$ respectively. In certain embodiments, M×1 multiplexer 208g may employ two M×1 multiplexers to convert M-lanes of stream $d_p$ into serial stream $d_{Op}$ and M-lanes of stream $d_n$ into serial stream $d_{On}$ independently.

As shown in FIG. 2, serial stream $d_{Op}$ and $d_{On}$ are then forwarded to second voltage driver 210. In certain embodiments, second voltage driver 210 may further employ transistors 210a and 210b. Transistor 210a may be configured to operate on serial stream $d_{Op}$ in such a manner that whenever there is a transition in serial stream $d_{Op}$ from high-to-low voltage level, transistor 210a is turned ON and thereby providing a low impedance in second parallel path 212b. Also, when the serial stream $d_{Op}$ transit from low-to-high voltage level, transistor 210a is turned OFF.

Similarly, transistor 210b may be configured to operate on serial stream $d_{On}$ in such a manner that whenever there is a transition in serial stream $d_{On}$ from low-to-high voltage level, transistor 210b is turned ON and thereby providing a low impedance in second parallel path 212b. Also, when the serial stream $d_{On}$ transit from high-to-low voltage level, transistor 210b is turned OFF.

It will be appreciated that transistors 204a and 204b operates on same input. However, transistors 210a and 210b operate on different inputs. It will be appreciated that in certain embodiments, transistors 204a and 210a may be implemented as P-type, transistors 204b and 210b may be implemented as N-type transistors, and transistors 204a, 210a, 204b and 210b may be designed in any know configuration. Such as, for example MOSFET etc.

Figure 4C:
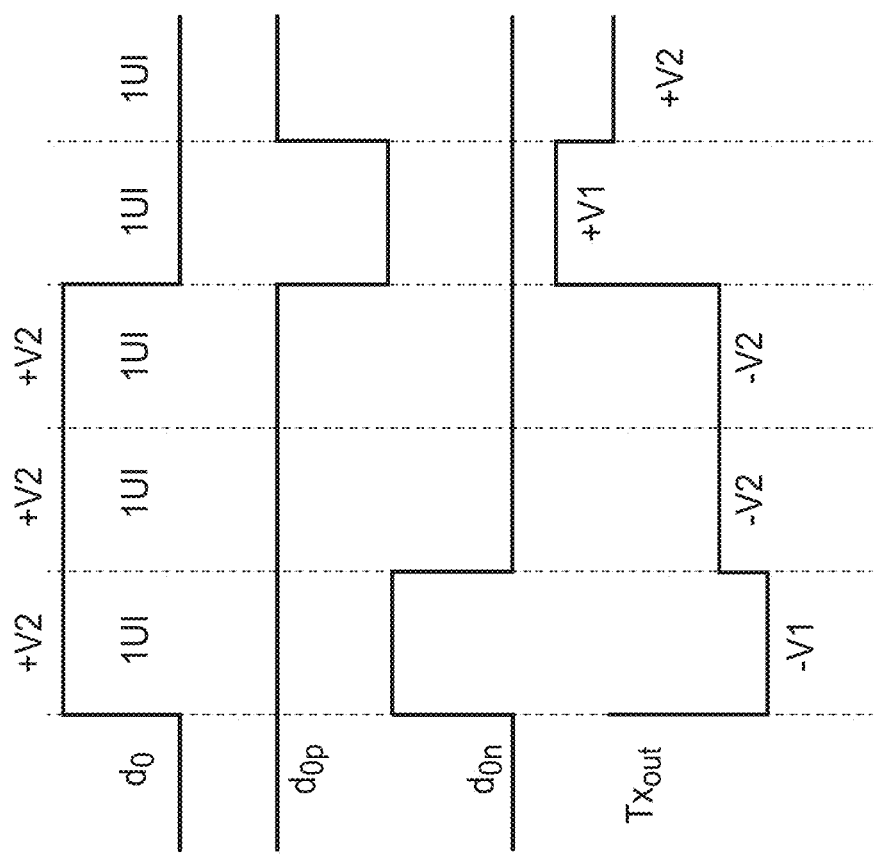
FIG. 4C illustrates a representative timing diagram corresponding to functionality of multi-level multi-mode transmitter, operating under moderate Z post-cursor mode, in accordance with various embodiments discussed in the present disclosure.

FIG. 4C illustrates a representative timing diagram corresponding to functionality of the multi-level multi-mode transmitter 200, operating under moderate Z post-cursor mode, in accordance with various embodiments discussed in the present disclosure. As shown, the timing diagram corresponding to serial stream $d_{Op}$ and serial stream $d_{On}$ in accordance with single data stream $d_0$. Serial stream $d_{Op}$ remains at a high voltage level as long as there is no transition from a high-to-low voltage level single data stream $d_0$. However, after the transition from a high-to-low voltage level in single data stream $d_0$, serial stream $d_{Op}$ also transits from a high-to-low voltage level for one UI. Similarly, serial stream $d_{On}$ remains at a low voltage level as long as there is no transition from a low-to-high voltage level single data stream $d_0$. However, after the transition from a low-to-high voltage level in single data stream $d_0$, serial stream $d_{On}$ transit from a low-to-high voltage level for one UI.

It will be appreciated that for the duration serial stream $d_{On}$ is at high voltage level, transistor 210b may be turned ON, resulting in low impedance in second parallel path 212b. Also, for the duration serial stream $d_0$ is at high voltage level, transistor 204b may be turned ON. Since, the transistor 204b and 210b may be implemented as N-type transistors therefore, the output voltage across termination impedance 206 may be negative with amplitude $V_1$.

However, serial stream $d_{On}$ may transit from high-to-low-level after one UI, turning OFF the transistor 210b. In this case, where both transistors 210a and 210b are turned OFF, impedance corresponding second parallel path 212b is very high. Hence, multi-level multi-mode transmitter 200 operates in normal mode with only first parallel path 212a operational and transistor 204b turned ON. Thereby, the output voltage across termination impedance 206 may shift to $-V_2$ as supplied by first voltage driver 204 in accordance with single data stream $d_0$.

It will be further appreciated that for the duration serial stream $d_{Op}$ is at low voltage level, transistor 210a may be turned ON, resulting in low impedance in second parallel path 212b. Also, for the duration serial stream $d_0$ is at low voltage level, transistor 204a may be turned ON. Since, the transistor 204a and 210a may be implemented as P-type transistors. To this end, the output voltage across termination impedance 206 may be Positive with amplitude $V_1$.

However, serial stream $d_{Op}$ may transit from low-to-high-level after one UI, turning OFF the transistor 210a. In this case, where both transistors 210a and 210b are turned OFF, impedance corresponding second parallel path 212b is very high. Hence, multi-level multi-mode transmitter 200 operates in normal mode with only first parallel path 212a operational and transistor 204a turned ON. Thereby, the output voltage across termination impedance 206 may shift to $+V_2$ as supplied by first voltage driver 204 in accordance with single data stream $d_0$.

In certain embodiments, the ratio $$\frac{V_1}{V_2}$$

may be greater than one. To this end, multi-level multi-mode transmitter 200 operating under moderate Z post-cursor mode may provide better signal-to-noise (SNR) post-cursor transitions from low-to-high voltage level or high-to-low voltage level in single data stream $d_0$ as compared to conventional multi-lane serial link transmitter 100, while operating under moderate impedance when there is no transitions in single data stream $d_0$.

Figure 5A:
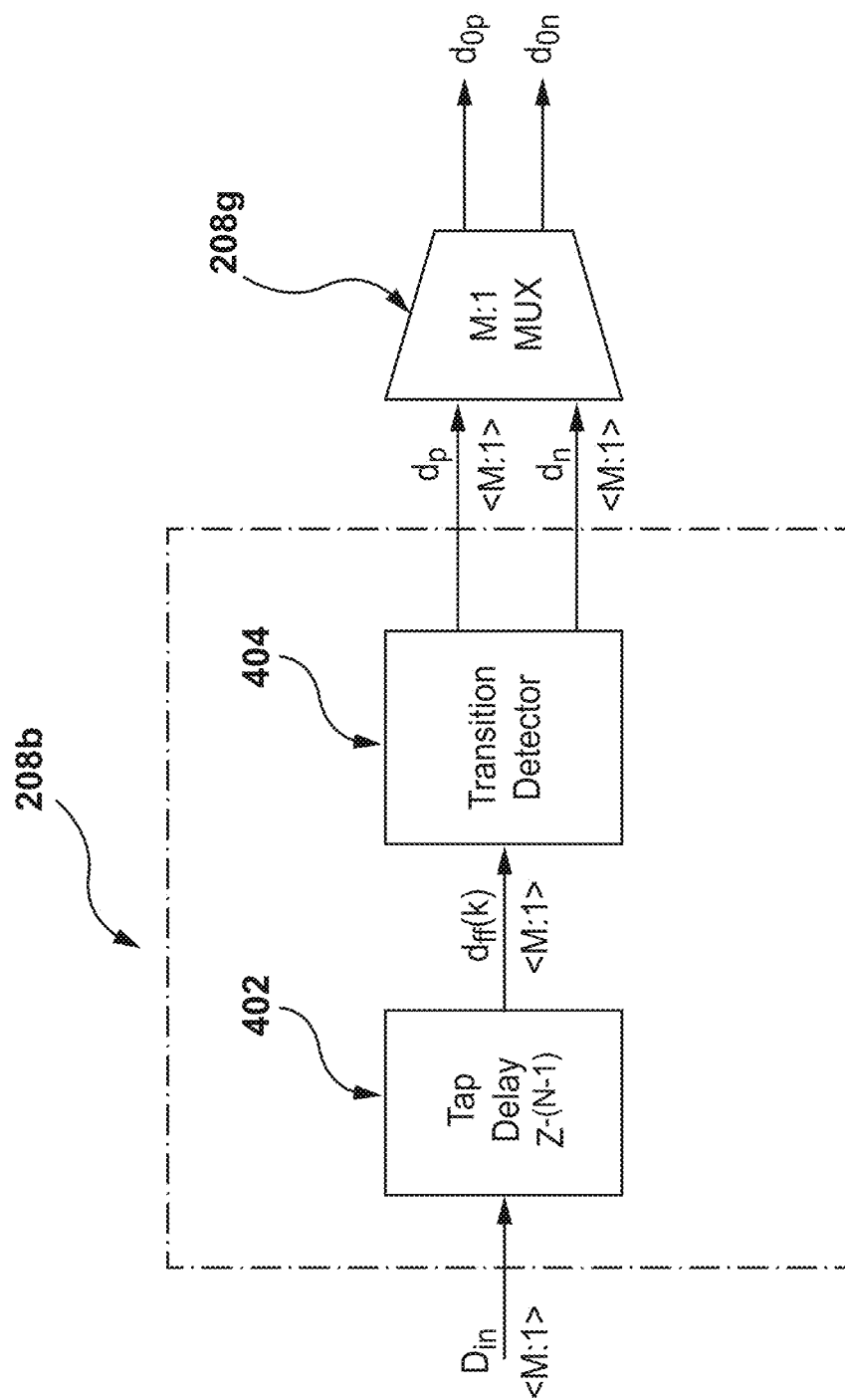
FIG. 5A represents an elaborative high-level functional block diagram of moderate Z pre-cursor module, in accordance with various embodiments discussed in the present disclosure.

FIG. 5A represents an elaborative high-level functional block diagram of moderate Z pre-cursor module 208b, in accordance with various embodiments discussed in the present disclosure. As shown, moderate Z pre-cursor module 208b may further employ a tap delay 402 and a transition detector 404. Tap delay 402 may be configured to delay each data lane by N−1 bit period. The delay provided by tap delay 402 is one bit less than delay as provided by tap delay 202a. In certain embodiments tap delay 402 may be configured to delay each data lane by N bit period however, in this configurations tap delay 202a may be configured to provide a delay of N+1. The M-lanes of delayed data stream $d_{ff}(k)$ are then forwarded to the transition detector 304 where k varies from 1 to M.

Figure 5B:
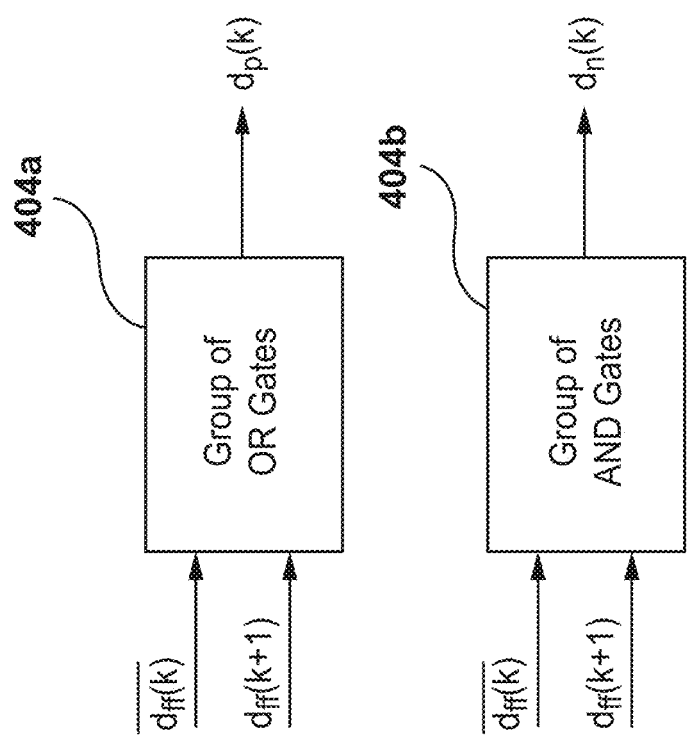
FIG. 5B illustrates a representative high-level functional block diagram of transition detector corresponding to moderate Z pre-cursor module, in accordance with various embodiments discussed in the present disclosure.

The transition detector 404 may be configured to detect the transitions from low-to-high voltage level and from high-to-low voltage level in M-lanes of delayed data stream $d_{ff}(k)$. In certain embodiments, transition detector 404 may employ a plurality of logic gates to perform transition detection. To this end, FIG. 5B illustrates a representative high-level functional block diagram of transition detector 404 corresponding to moderate Z pre-cursor module 208b, in accordance with various embodiments discussed in the present disclosure. As shown, the transition detector 404 may employ a group of AND gates 404a and a group of OR gates 404b.

The group of OR gates 404a may be configured to detect the low-to-high voltage level transitions in M-lanes of delayed data stream $d_{ff}(k)$. In so doing, the group of OR gate 404a performs OR operation on inverted current data bit and next data bit of each lane of data stream in M-lanes of delayed data stream $d_{ff}(k)$. The output of the group of OR gates 404a is M-lanes of stream $d_p$ such that each lane in M-lanes of stream $d_p$ transits from high-to-low voltage level after there is a transition from low-to-high voltage level in data stream of each lane in M-lanes of delayed data stream $d_{ff}(k)$. Moreover, each lane in M-lanes of stream $d_p$ returns to high state after one unit interval (UI).

Similarly, the group of AND gates 404b may be configured to detect the high-to-low voltage level transitions in M-lanes of delayed data stream $d_{ff}(k)$. In so doing, the group of AND gates 404b performs AND operation on inverted current data bit and next data bit of each lane of data stream in M-lanes of delayed data stream $d_{ff}(k)$. The output of the group of AND gates 404b is M-lanes of stream $d_n$ such that each lane in M-lanes of stream $d_n$ transits from low-to-high voltage level after there is a transition from low-to-high voltage level in data stream of each lane in M-lanes of delayed data stream $d_{ff}(k)$. Moreover, each lane in M-lanes of stream $d_n$ returns to low state after one unit interval (UI).

Returning to FIG. 5A, the transition detector 304 supplies the M-lanes of stream $d_p$ and M-lanes of stream $d_n$ to M×1 multiplexer 208g. M×1 multiplexer 208g may be configured to convert M-lanes of stream $d_p$ and M-lanes of stream $d_N$ into serial stream $d_{Op}$ and $d_{On}$ respectively.

As shown in FIG. 2, serial stream $d_{Op}$ and $d_{On}$ are then forwarded to second voltage driver 210. In certain embodiments, transistor 210a may be configured to operate on serial stream $d_{Op}$ in such a manner that whenever there is a transition in serial stream $d_{Op}$ from high-to-low voltage level, transistor 210a is turned ON and thereby providing a low impedance in second parallel path 212b. Also, when the serial stream $d_{Op}$ transit from low-to-high voltage level, transistor 210a is turned OFF.

Similarly, transistor 210b may be configured to operate on serial stream $d_{On}$ in such a manner that whenever there is a transition in serial stream $d_{On}$ from low-to-high voltage level, transistor 210b is turned ON and thereby providing a low impedance in second parallel path 212b. Also, when the serial stream $d_{On}$ transit from high-to-low voltage level, transistor 210b is turned OFF.

Figure 5C:
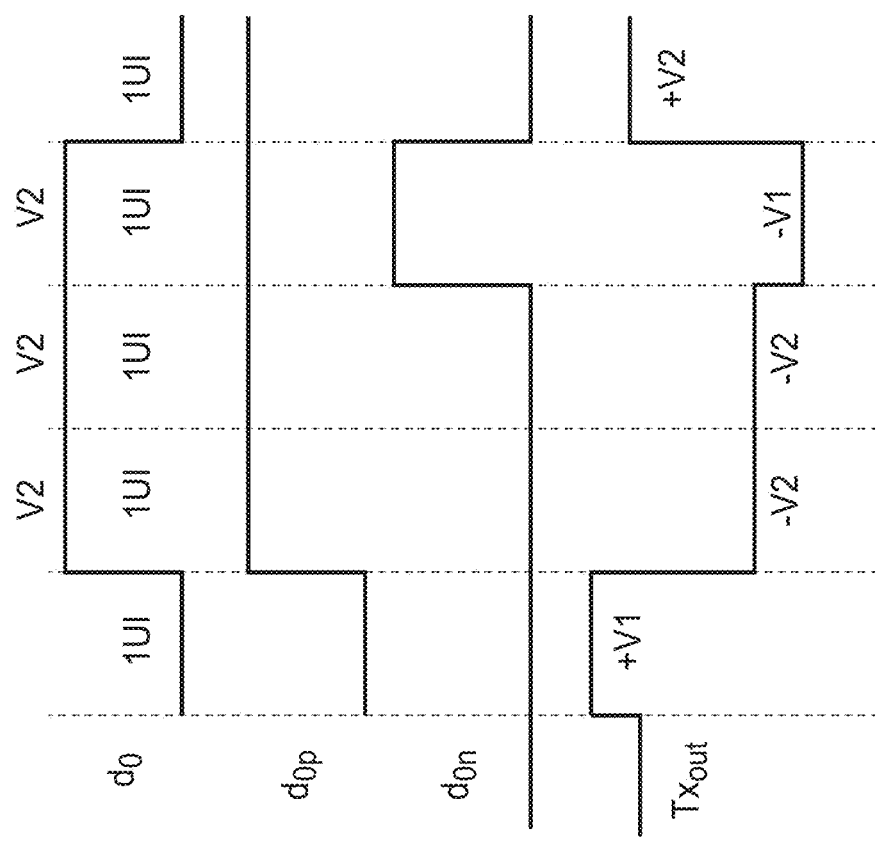
FIG. 5C illustrates a representative timing diagram corresponding to functionality of multi-level multi-mode transmitter, operating under moderate Z pre-cursor mode, in accordance with various embodiments discussed in the present disclosure.

FIG. 5C illustrates a representative timing diagram corresponding to functionality of multi-level multi-mode transmitter 200, operating under moderate Z pre-cursor mode, in accordance with various embodiments discussed in the present disclosure. As shown, the timing diagram corresponding to serial stream $d_{Op}$ and serial stream $d_{On}$ in accordance with delayed data stream $d_{ff}(k)$.

As previously discussed, delay provided by tap delay filter 402 is one bit less as compared to the delay provided by tap delay filter 202a. To this end, serial stream $d_{Op}$ remains at a high voltage level as long as there is no transition from a low-to-high voltage level single data stream $d_0$. However, one UI before single data stream $d_0$ transit from a low-to-high voltage level, serial stream $d_{Op}$ also transit from a high-to-low voltage level for one UI. Similarly, serial stream $d_{On}$ remains at a low voltage level as long as there is no transition from a high-to-low voltage level single data stream $d_0$. However, one UI before single data stream $d_0$ transit from a high-to-low, serial stream $d_{On}$ transit from a low-to-high voltage level for one UI.

It will be appreciated that for the duration serial stream $d_{On}$ is at high voltage level, transistor 210b may be turned ON, resulting in low impedance in second parallel path 212b. Also, for the duration serial stream $d_0$ is at high voltage level, transistor 204b may be turned ON. Since, the transistor 204b and 210b may be implemented as N-type transistors. To this end, the output voltage across termination impedance 206 may be negative with amplitude $V_1$.

However, serial stream $d_{On}$ may transit from high-to-low-level after one UI, turning OFF the transistor 210b. In this case, where both transistors 210a and 210b are turned OFF, impedance corresponding second parallel path 212b is very high. Hence, multi-level multi-mode transmitter 200 operates in normal mode with only first parallel path 212a operational and transistor 204a turned ON. Thereby, the output voltage across termination impedance 206 may shift to +$V_2$ as supplied by first voltage driver 204 in accordance with single data stream $d_0$.

It will be further appreciated that for the duration serial stream $d_{Op}$ is at low voltage level, transistor 210a may be turned ON, resulting in low impedance in second parallel path 212b. Also, for the duration serial stream $d_0$ is at low voltage level, transistor 204a may be turned ON. Since, the transistor 204a and 210a may be implemented as P-type transistors. To this end, the output voltage across termination impedance 206 may be Positive with amplitude $V_1$.

However, serial stream $d_{Op}$ may transits from low-to-high-level after one UI, turning OFF the transistor 210a. In this case, where both transistors 210a and 210b are turned OFF, impedance corresponding second parallel path 212b is very high. Hence, multi-level multi-mode transmitter 200 operates in normal mode with only first parallel path 212a operational and transistor 204b turned ON. Thereby, the output voltage across termination impedance 206 may shift to −$V_2$ as supplied by first voltage driver 204 in accordance with single data stream $d_0$.

In certain embodiments, the ratio $$\frac{V_1}{V_2}$$

may be greater than one. To this end, multi-level multi-mode transmitter 200 operating under moderate Z pre-cursor mode may provide a better signal-to-noise (SNR) pre-cursor transitions from low-to-high voltage level or high-to-low voltage level in single data stream $d_0$ as compared to conventional multi-lane serial link transmitter 100, while operating under moderate impedance when there are no transitions in single data stream $d_0$.

Figure 6A:
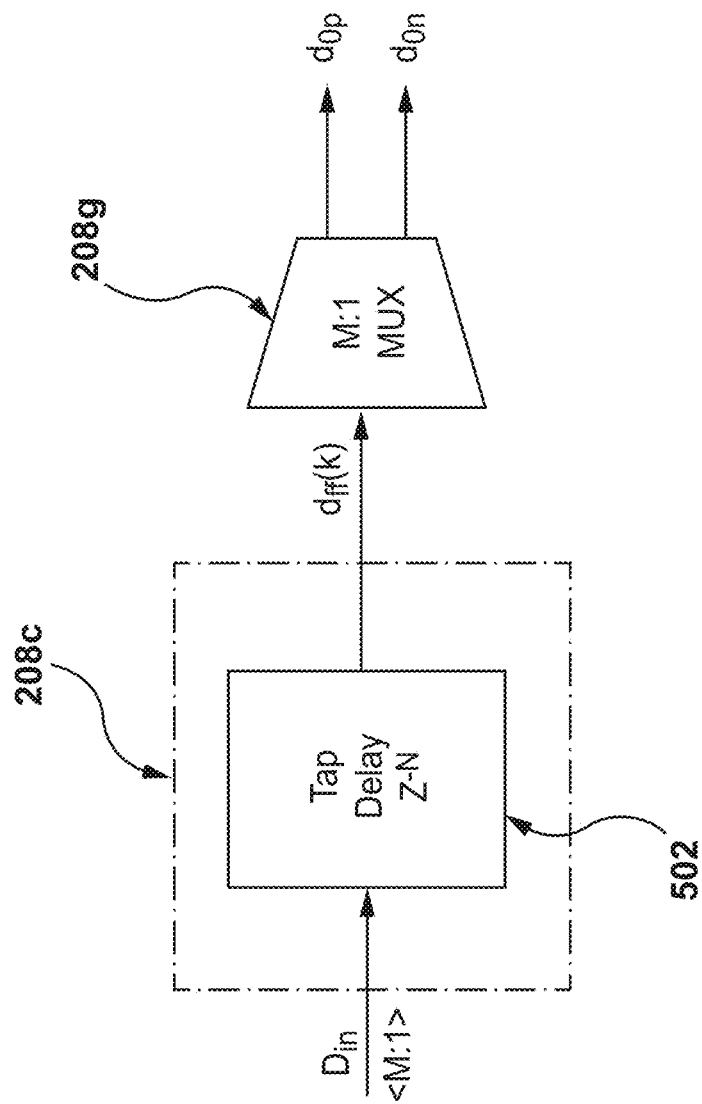
FIG. 6A represents an elaborative high-level functional block diagram of low Z high-swing module, in accordance with various embodiments discussed in the present disclosure.

FIG. 6A represents an elaborative high-level functional block diagram of low Z high-swing module 208c, in accordance with various embodiments discussed in the present disclosure. As shown, low Z high-swing module 208c may further employ a tap delay 502. Tap delay 502 may be configured to delay each data lane by N bit period. The delay provided by tap delay 502 is same delay as provided by tap delay 202a. The M-lanes of delayed data stream $d_{ff}(k)$ are then forwarded to M×1 multiplexer 208g, where k varies from 1 to M. M×1 multiplexer 208g may be configured to convert M-lanes of stream $d_{ff}(k)$ into serial stream $d_{Op}$ and $d_{On}$, where $d_{Op}$ and $d_{On}$ mimics single data stream $d_0$.

Returning to FIG. 2, serial stream $d_{Op}$ and $d_{On}$ are then forwarded to second voltage driver 210. In certain embodiments, voltage drivers 204 and 210 may operate in similar manner. As such, first parallel path 212a and second parallel path 212b may have identical resistance and delays. Thereby, reducing the effective resistance at the output of drivers by half, resulting in increased voltage across termination impedance 206 as given by:

$$Tx_{High-Swing\ Mode} = Tx_{Normal\ mode} \times \frac{z_{tx} + z_{term}}{0.5 * z_{tx} + z_{term}} \quad (2)$$

Where, $z_{term}$ is the termination impedance 206, $z_{tx}$ is the individual impedances of voltage drivers 204 and 210, $Tx_{Normal\ Mode}$ is the voltage normal voltage across termination impedance 206 without a functional second parallel path 212b and $Tx_{High-Swing\ Mode}$ is the high swing voltage across termination impedance 206 with a functional second parallel path 212b.

Figures 6B, 6C:
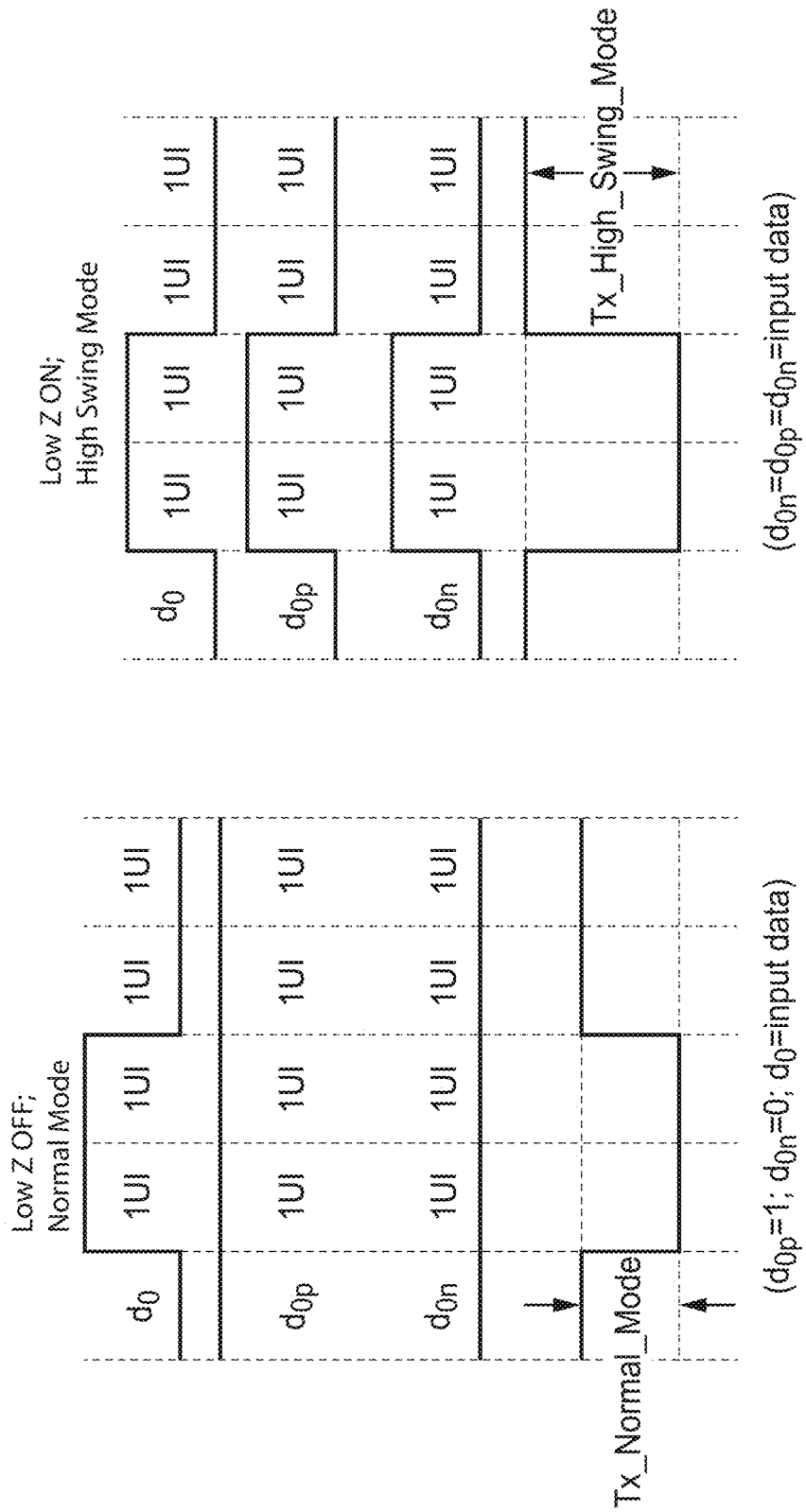
FIGS. 6B and 6C illustrate a representative timing diagrams corresponding to functionality of multi-level multi-mode transmitter, operating under normal mode and high swing mode respectively, in accordance with various embodiments discussed in the present disclosure.

FIGS. 6B and 6C illustrate a representative timing diagrams corresponding to functionality of multi-level multi-mode transmitter 200, operating under normal mode and high swing mode respectively, in accordance with various embodiments discussed in the present disclosure. As shown in FIG. 6B, the timing diagram corresponding to normal mode of operation is under assumption that serial stream $d_{Op}$ has been set at a constant high and serial stream $d_{On}$ is set at constant low. In so doing, transistors 210a and 210b are turned OFF, therefore second parallel path 212b provides a very high impedance. As such, the output across termination impedance 206 is inverted with respect to single data stream $d_0$ with a maximum amplitude of $Tx_{Normal\ Mode}$.

As shown in FIG. 6C, the timing diagram corresponding to high swing mode of operation where serial stream $d_{Op}$ and $d_{On}$ mimics single data stream $d_0$. To this end, for high voltage level of serial stream $d_{Op}$ and $d_{On}$ and single data stream $d_0$ transistors 204b and 210b are turned ON transistors 204a and 210a are turned OFF. Similarly, for low voltage level of serial stream $d_{Op}$ and $d_{On}$ and single data stream $d_0$ transistors 204b and 210b are turned OFF transistors 204a and 210a are turned ON. In so doing, the output across termination impedance 206 is inverted with respect to single data stream $d_0$ with a maximum amplitude of $Tx_{High-Swing\ Mode}$. It will be appreciated that value of $Tx_{High-Swing\ Mode}$ is greater than $Tx_{Normal\ Mode}$.

Figure 6D:
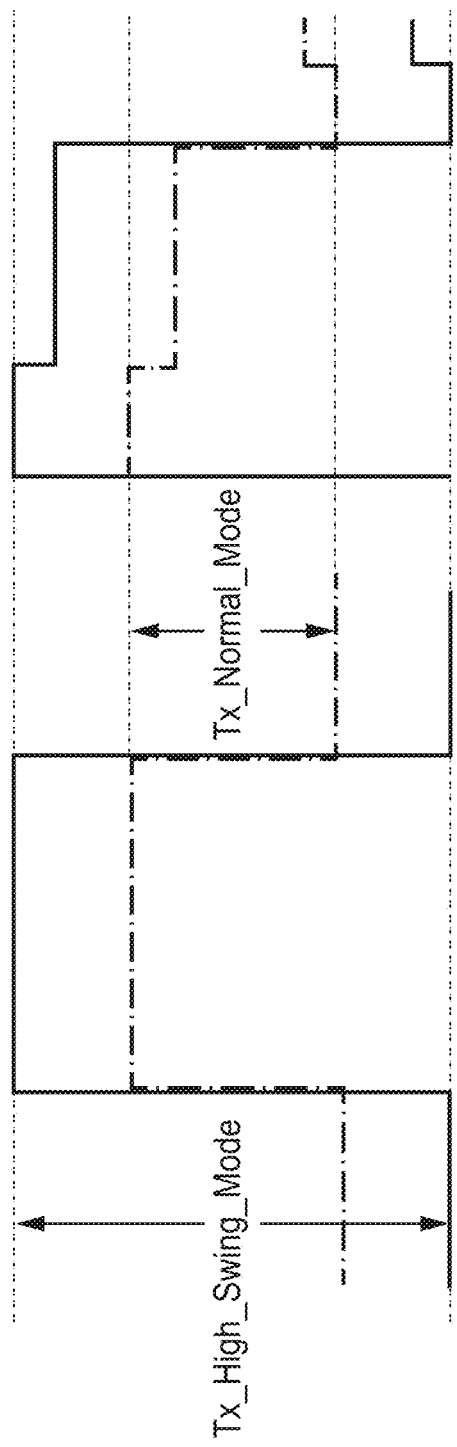
FIG. 6D illustrates a representative voltage boost corresponding to functionality of multi-level multi-mode transmitter, operating high swing mode, in accordance with various embodiments discussed in the present disclosure.

FIG. 6D illustrates a representative voltage boost corresponding to functionality of multi-level multi-mode transmitter 200, operating high swing mode, in accordance with various embodiments discussed in the present disclosure. In certain embodiments, first pre-driver 202 may also be configured to provide a post-cursor, pre-cursor or cursor compensation. To this end, as shown in FIG. 6D, multi-level multi-mode transmitter 200, operating under high swing mode may be configured to boost post-cursor, pre-cursor or cursor compensation as provided by first pre-driver 202.

Figure 7A:
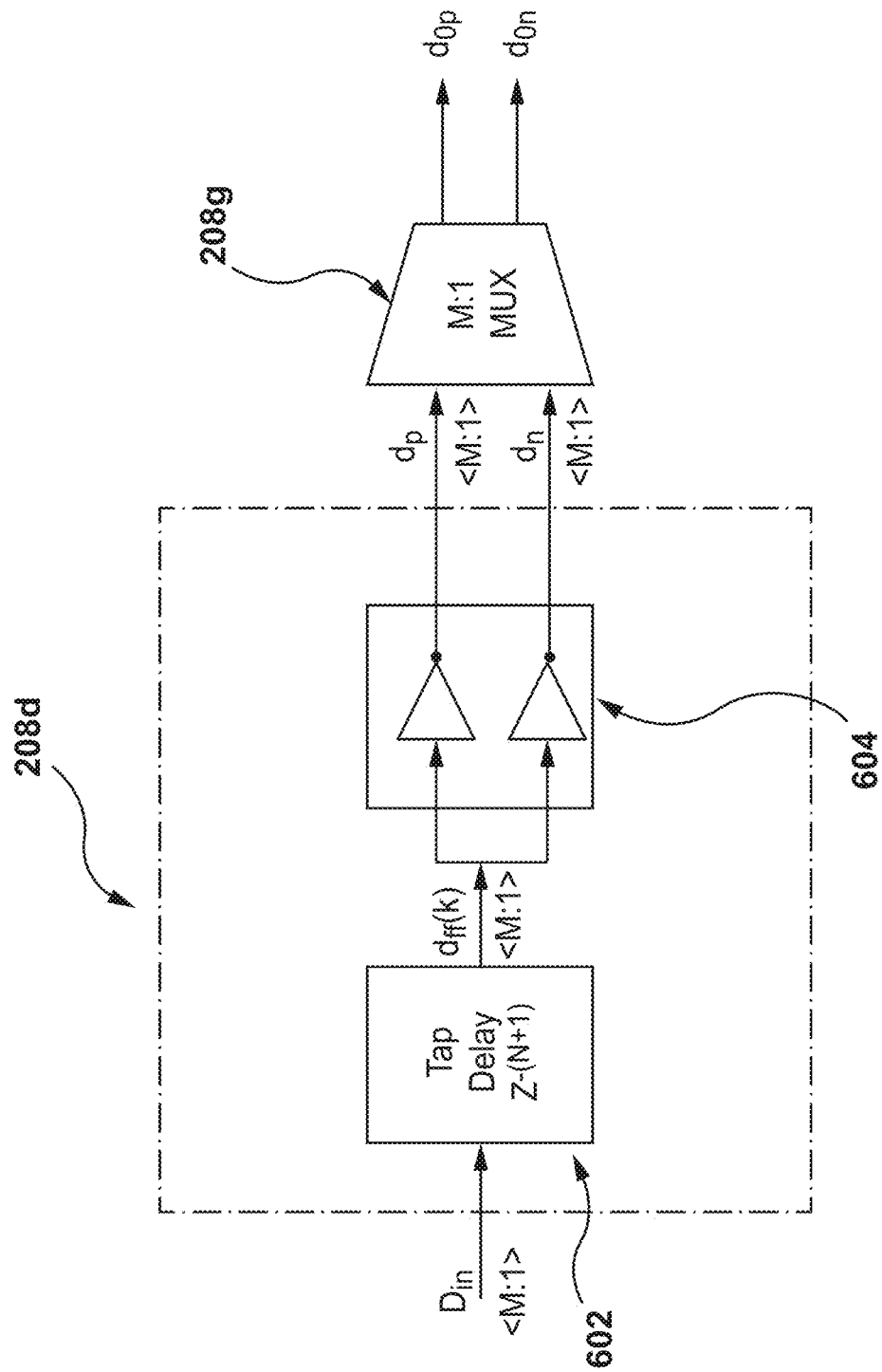
FIG. 7A represents an elaborative high-level functional block diagram of low Z post-cursor module, in accordance with various embodiments discussed in the present disclosure.

FIG. 7A represents an elaborative high-level functional block diagram of low Z post-cursor module 208d, in accordance with various embodiments discussed in the present disclosure. As shown, low Z post-cursor module 208d may further employs a tap delay 602 and a group of inverters 604. Tap delay 602 may be configured to delay each data lane by N+1 bit period. The delay provided by tap delay 602 is one bit more than delay as provided by tap delay 202a. In certain embodiments tap delay 602 may be configured to delay each data lane by N bit period however, in this configurations tap delay 202a may be configured to provide a delay of N−1. The M-lanes of delayed data stream $d_{ff}(k)$ are then forwarded to the group of inverters 604 where k varies from 1 to M.

The group of inverters 604 may be configured to invert M-lanes of delayed data stream $d_{ff}(k)$. In so doing, the group of inverters 604 performs NOT operation delayed data stream $d_{ff}(k)$. The output of the group of inverters 604 are M-lanes of stream $d_p$ and M-lanes of stream $d_n$. The group of inverters 604 supplies the M-lanes of stream $d_p$ and M-lanes of stream $d_n$ to M×1 multiplexer 208g. M×1 multiplexer 208g may be configured to convert M-lanes of stream $d_p$ and M-lanes of stream $d_n$ into serial stream $d_{Op}$ and $d_{On}$ respectively.

In certain embodiments, serial stream $d_{Op}$ and $d_{On}$ may be identical. Serial stream $d_{Op}$ and $d_{On}$ are then forwarded to second voltage driver 210. Further, transistor 210a may be configured to operate on serial stream $d_{Op}$ in such a manner that whenever there is a transition in serial stream $d_{Op}$ from high-to-low voltage level or low-to-high voltage level, transistor 210a is turned ON or turned OFF respectively. Similarly, transistor 210b may be configured to operate on serial stream $d_{On}$ in such a manner that whenever there is a transition in serial stream $d_{On}$ from low-to-high voltage level or high-to-low voltage level, transistor 210b is turned ON or turned OFF respectively.

Figure 7B:
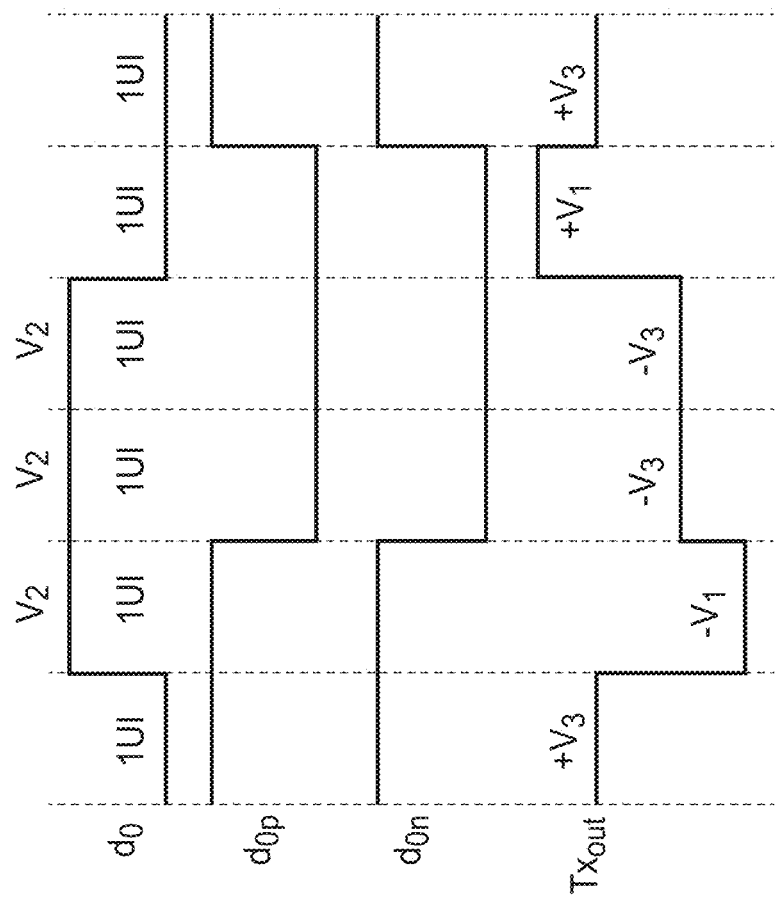
FIG. 7B illustrates a representative timing diagram corresponding to functionality of multi-level multi-mode transmitter, operating under low Z post-cursor mode, in accordance with various embodiments discussed in the present disclosure.

FIG. 7B illustrates a representative timing diagram corresponding to functionality of multi-level multi-mode transmitter 200, operating under low Z post-cursor mode, in accordance with various embodiments discussed in the present disclosure. As shown, the timing diagram corresponding to serial stream $d_{Op}$ and serial stream $d_{On}$ in accordance with delayed data stream $d_{ff}(k)$.

As previously discussed, delay provided by tap delay filter 602 is one bit more as compared to the delay provided by tap delay filter 202a. To this end, for one UI after single data stream $d_0$ transits from high-to-low voltage level or low-to-high voltage level serial stream $d_{Op}$, serial stream $d_{On}$ and single data stream $d_0$ may have a voltage level of same polarity.

As such, after single data stream $d_0$ transits from low-to-high voltage level, transistors 204b and 210b may be turned ON while transistors 204a and 210a may be turned OFF. To this end, for one UI the output voltage across termination impedance 206 may be negative with amplitude $V_1$. In a similar manner, after single data stream $d_0$ transits from high-to-low voltage level, transistors 204b and 210b may be turned OFF while transistors 204a and 210a may be turned ON. To this end, for one UI the output voltage across termination impedance 206 may be positive with amplitude $V_1$.

Moreover, one UI after single data stream $d_0$ transits from high-to-low voltage level or low-to-high voltage level, serial stream $d_{Op}$, serial stream $d_{On}$ may have a voltage level of opposite polarity as compare to single data stream $d_0$. To this end, as shown in FIG. 7B, when single data stream $d_0$ is at a high voltage level and the corresponding serial stream $d_{Op}$ and serial stream $d_{On}$ are at a low voltage level, transistors 204b and 210a are tuned ON and transistors 204a and 210b are tuned OFF, resulting a low impedance in second parallel path 212b.

Since, the output voltage across termination impedance 206 due to transistor 204b may be having positive amplitude, whereas the output voltage across termination impedance 206 due to transistor 210a may be having negative amplitude. Hence, the net effective voltage across termination impedance 206 reduces. In certain embodiments, the net effective voltage across termination impedance 206 may be negative with amplitude $V_3$.

Similarly, when single data stream $d_0$ is at a low voltage level and the corresponding serial stream $d_{Op}$ and serial stream $d_{On}$ are at a high voltage level, transistors 204a and 210b are tuned ON and transistors 204b and 210a are tuned OFF, resulting low impedance in second parallel path 212b. Since, the output voltage across termination impedance 206 due to transistor 204a may be having negative amplitude, whereas the output voltage across termination impedance 206 due to transistor 210b may be having positive amplitude. Hence, the net effective voltage across termination impedance 206 reduces. In certain embodiments, the net effective voltage across termination impedance 206 may be positive with amplitude $V_3$.

In Certain embodiments, the ratio $$\frac{V_1}{V_3}$$

may be greater than or equal to four and hence satisfying the IEEE 802.3 specifications of post-cursor boost $$\frac{V_1}{V_3}$$

to be equal to or greater than four. To this end, multi-level multi-mode transmitter 200 operating under low Z post-cursor mode may provide better signal-to-noise (SNR) post-cursor transitions from low-to-high voltage level or high-to-low voltage level in single data stream $d_0$ as compared to conventional multi-lane serial link transmitter 100, while operating under low impedance.

Figure 8A:
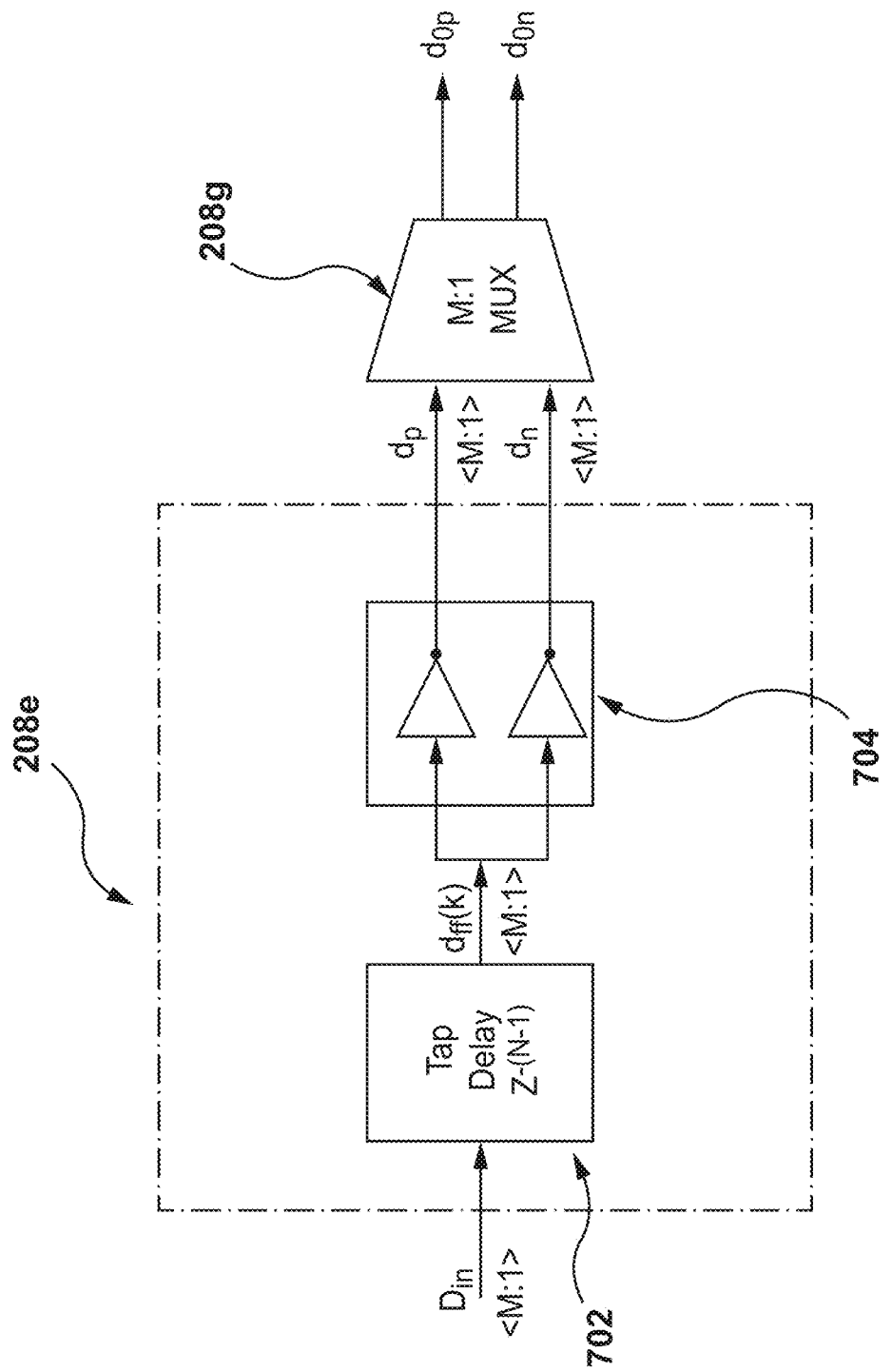
FIG. 8A represents an elaborative high-level functional block diagram of low Z post-cursor module, in accordance with various embodiments discussed in the present disclosure.

FIG. 8A represents an elaborative high-level functional block diagram of low Z pre-cursor module 208e, in accordance with various embodiments discussed in the present disclosure. As shown, low Z pre-cursor module 208e may further employ a tap delay 702 and a group of inverters 704. Tap delay 702 may be configured to delay each data lane by N−1 bit period. The delay provided by tap delay 702 is one bit less than delay as provided by tap delay 202a. In certain embodiments tap delay 702 may be configured to delay each data lane by N bit period however, in this configurations tap delay 202a may be configured to provide a delay of N+1. The M-lanes of delayed data stream $d_{ff}(k)$ are then forwarded to the group of inverters 702 where k varies from 1 to M.

The group of inverters 704 may be configured to invert M-lanes of delayed data stream $d_{ff}(k)$. In so doing, the group of inverters 704 performs NOT operation delayed data stream $d_{ff}(k)$. The output of the group of inverters 704 are M-lanes of stream $d_p$ and M-lanes of stream $d_n$. The group of inverters 704 supplies the M-lanes of stream $d_p$ and M-lanes of stream $d_n$ to M×1 multiplexer 208g. M×1 multiplexer 208g may be configured to convert M-lanes of stream $d_p$ and M-lanes of stream $d_n$ into serial stream $d_{Op}$ and $d_{On}$ respectively.

In certain embodiments, serial stream $d_{Op}$ and $d_{On}$ may be identical. Serial stream $d_{Op}$ and $d_{On}$ are then forwarded to second voltage driver 210. Further, transistor 210a may be configured to operate on serial stream $d_{Op}$ in such a manner that whenever there is a transition in serial stream $d_{Op}$ from high-to-low voltage level or low-to-high voltage level, transistor 210a is turned ON or turned OFF respectively. Similarly, transistor 210b may be configured to operate on serial stream $d_{On}$ in such a manner that whenever there is a transition in serial stream $d_{Op}$ from low-to-high voltage level or high-to-low voltage level, transistor 210b is turned ON or turned OFF respectively.

FIG. 8B illustrates a representative timing diagram corresponding to functionality of multi-level multi-mode transmitter 200, operating under low Z pre-cursor mode, in accordance with various embodiments discussed in the present disclosure. As shown, the timing diagram corresponding to serial stream $d_{Op}$ and serial stream $d_{On}$ in accordance with delayed data stream $d_{ff}(k)$.

As previously discussed, delay provided by tap delay filter 702 is one bit less as compared to the delay provided by tap delay filter 202a. To this end, for one UI before single data stream $d_0$ transits from high-to-low voltage level or low-to-high voltage level serial stream $d_{Op}$, serial stream $d_{On}$ and single data stream $d_0$ may have a voltage level of same polarity.

As such, one UI before single data stream $d_0$ transits from low-to-high voltage level, transistors 204a and 210a may be turned ON while transistors 204b and 210b may be turned OFF. To this end, for one UI the output voltage across termination impedance 206 may be positive with amplitude $V_1$. In a similar manner, one UI before single data stream $d_0$ transits from high-to-low voltage level, transistors 204a and 210a may be turned OFF while transistors 204b and 210b may be turned ON. To this end, for one UI the output voltage across termination impedance 206 may be negative with amplitude $V_1$.

Moreover, after single data stream $d_0$ transits from high-to-low voltage level or low-to-high voltage level, serial stream $d_{Op}$, serial stream $d_{On}$ may have a voltage level of opposite polarity as compare to single data stream $d_0$. To this end, as shown in FIG. 8B, when single data stream $d_0$ is at a high voltage level and the corresponding serial stream $d_{Op}$ and serial stream $d_{On}$ are at a low voltage level, transistors 204b and 210a are tuned ON and transistors 204a and 210b are tuned OFF, resulting a low impedance in second parallel path 212b.

Since, the output voltage across termination impedance 206 due to transistor 204b may be having positive amplitude, whereas the output voltage across termination impedance 206 due to transistor 210a may be having negative amplitude. Hence, the net effective voltage across termination impedance 206 reduces. In certain embodiments, the net effective voltage across termination impedance 206 may be negative with amplitude $V_3$.

Similarly, when single data stream $d_0$ is at a low voltage level and the corresponding serial stream $d_{Op}$ and serial stream $d_{On}$ are at a high voltage level, transistors 204a and 210b are tuned ON and transistors 204b and 210a are tuned OFF, resulting low impedance in second parallel path 212b. Since, the output voltage across termination impedance 206 due to transistor 204a may be having negative amplitude, whereas the output voltage across termination impedance 206 due to transistor 210b may be having positive amplitude. Hence, the net effective voltage across termination impedance 206 reduces. In certain embodiments, the net effective voltage across termination impedance 206 may be positive with amplitude $V_3$.

In Certain embodiments, the ratio $$\frac{V_1}{V_3}$$

may be greater than or equal to four, depending on the impedance of first voltage driver 204 compared to the impedance of the second voltage driver 210. To this end, multi-level multi-mode transmitter 200 operating under low Z pre-cursor mode may provide better signal-to-noise (SNR) pre-cursor transitions from low-to-high voltage level or high-to-low voltage level in single data stream $d_0$ as compared to conventional multi-lane serial link transmitter 100.

Figure 9A:
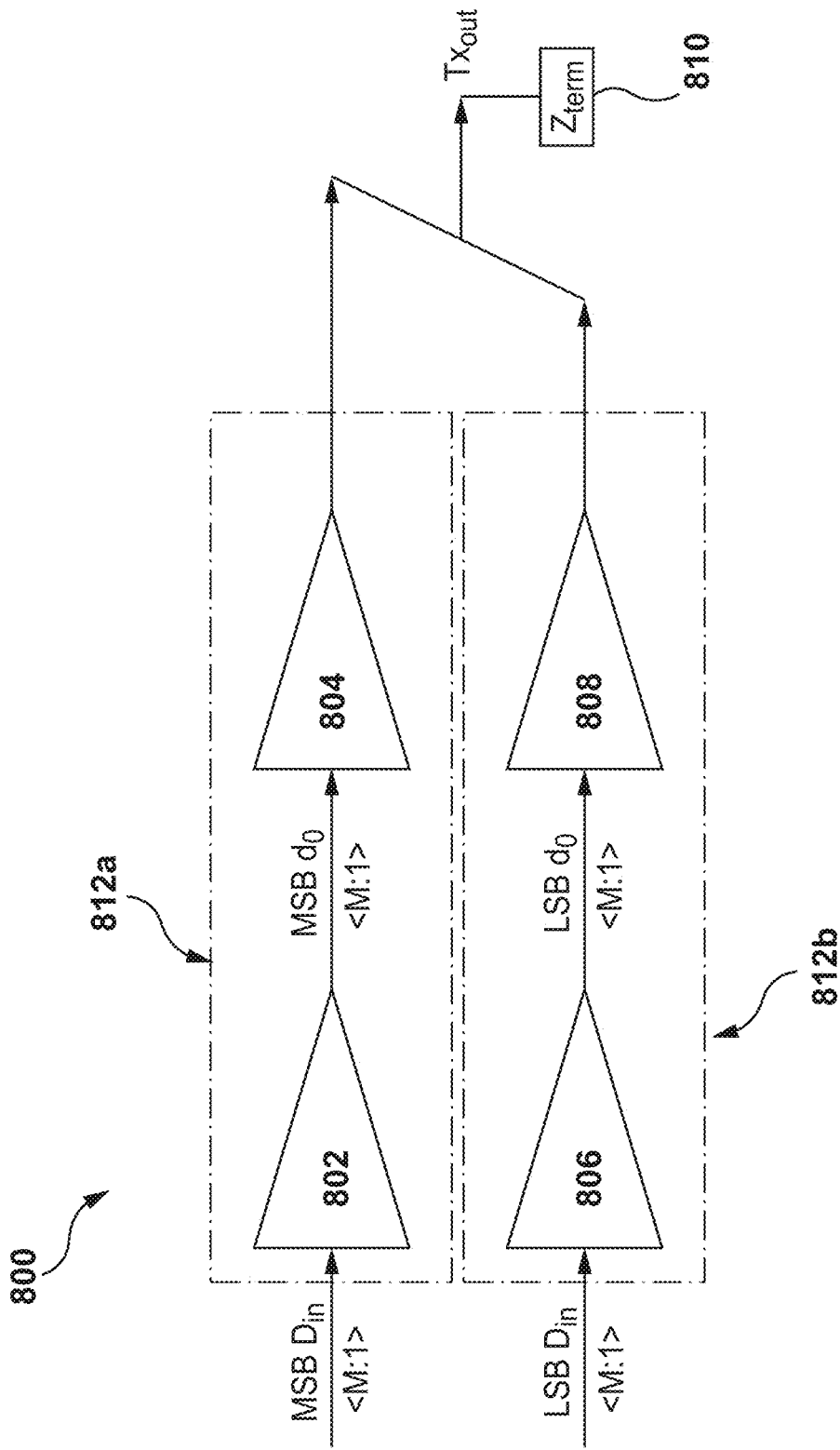
FIG. 9A (Prior Art) depicts a high-level functional block diagram of a conventional four level pulse amplitude modulated (PAM)

FIG. 9A (Prior Art) depicts a high-level functional block diagram of a conventional four level pulse amplitude modulated (PAM) transmitter 800 directed to converting M-lanes of MSB data stream and M-lanes of LSB data stream into single high speed data stream and transmitting the single high speed data stream for further operations. The conventional PAM 4 transmitter 800 includes pre-driver 802 and 806, voltage drivers 804 and 808, and a termination impedance 810. It will be understood that other elements may be present, but are not illustrated for the purpose of tractability and simplicity.

As shown in FIG. 9A, pre-driver 802 and voltage drivers 804 operates on first stream of maximum significant bits (MSBs) $MSBD_0$ and pre-driver 806 and voltage drivers 808 operates on second stream of least significant bits (LSBs) $LSBD_0$. It is to be understood that conventional PAM 4 transmitter 800 operates in a similar manner as that of conventional multi-lane serial link transmitter 100 and provides a voltage $Tx_{out}$ across the termination impedance 810. It is also to be understood that for PAM 4 operation, voltage drivers 804 may have twice as many transistors when compared to voltage drivers 808, thus voltage drivers 804 ensures half the impedance as that of voltage drivers 808.

Similar to conventional multi-lane serial link transmitter 100, conventional PAM 4 transmitter 800 presents certain limits on transmission efficiency of transmitters in various aspects such as output voltage amplitude and voltage swings. Further, conventional PAM 4 transmitter 800 also compromises with the transmission efficiency while combating with post cursor and precursor inter-symbol interferences caused by preceding or the following symbol in input data stream.

Figure 9B:
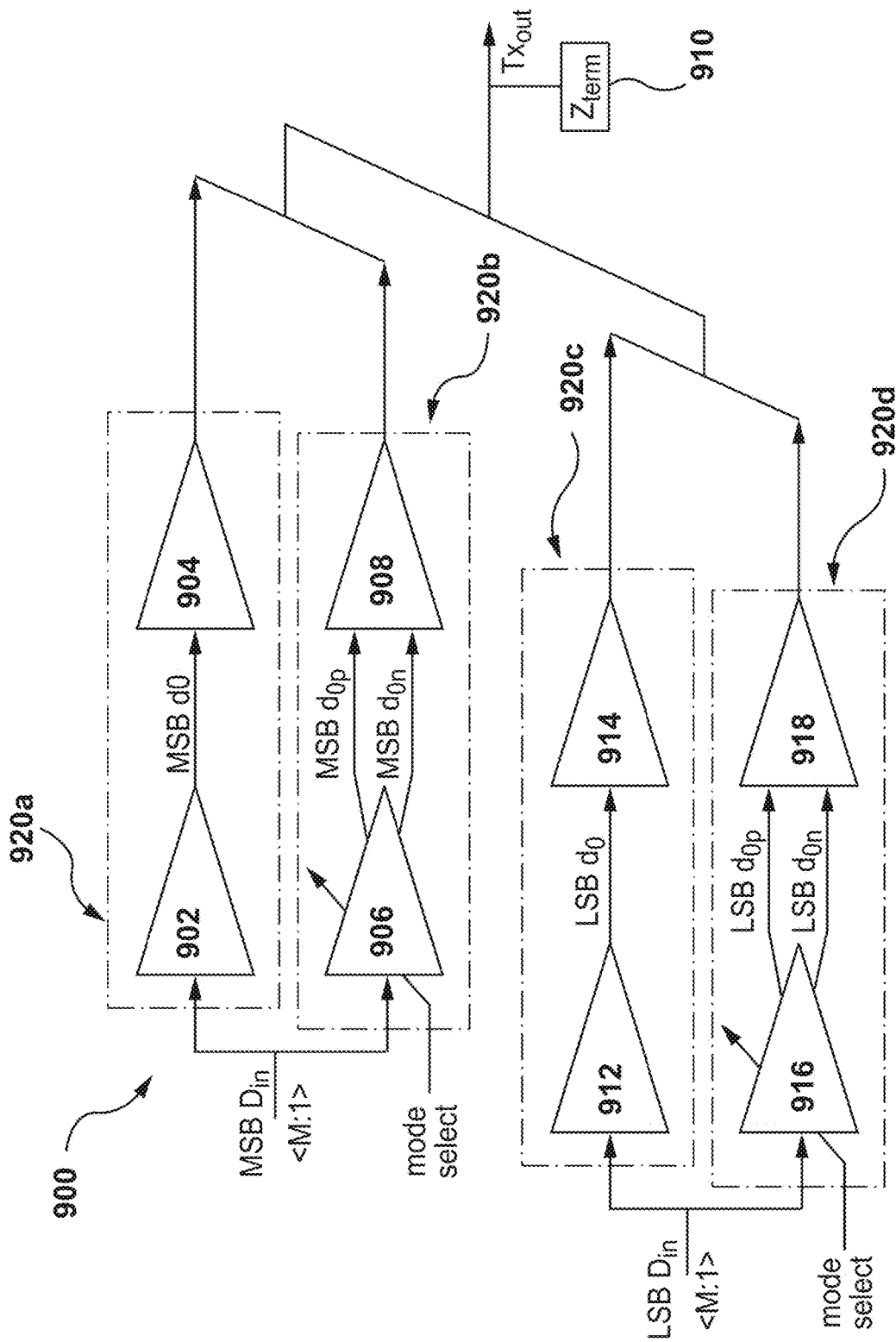
FIG. 9B depicts a high-level functional block diagram of a multi-level based four level PAM transmitter, in accordance with various embodiments discussed in the present disclosure.

FIG. 9B depicts a high-level functional block diagram of a multi-level based four level PAM transmitter 900, in accordance with various embodiments discussed in the present disclosure. As shown, multi-level based four level PAM transmitter 900 includes pre-drivers 902, 906, 912 and 916, voltage drivers 904, 908, 914, and 918 and a termination impedance 910. It will be understood that other elements may be present, but are not illustrated for the purpose of tractability and simplicity.

In certain embodiments, multi-level based four level PAM transmitter 900 receives a first stream of MSBs $MSBD_0$ and a second stream of LSBs $LSBD_0$ in parallel paths. As such, a parallel path 920a employing the pre-driver 902 and the voltage driver 904 may be configured to operate on first stream of MSBs $MSBD_0$ in a conventional manner. However, a parallel path 902b employing the pre-driver 906 and the voltage driver 908 may be configured to operate on first stream of MSBs $MSBD_0$, in accordance multi-level multi-mode transmitter 200 to provide a high output voltage swing as well as combat with post cursor and precursor inter-symbol interferences.

Similarly, a parallel path 920c employing the pre-driver 912 and the voltage driver 914 may be configured to operate on second stream of LSBs $LSBD_0$ in a conventional manner. However, a parallel path 920d employing the pre-driver 916 and the voltage driver 918 may be configured to operate on second stream of LSBs $LSBD_0$, in accordance multi-level multi-mode transmitter 200 to provide a high output voltage swing as well as combat with post cursor and precursor inter-symbol interferences.

Figure 10:
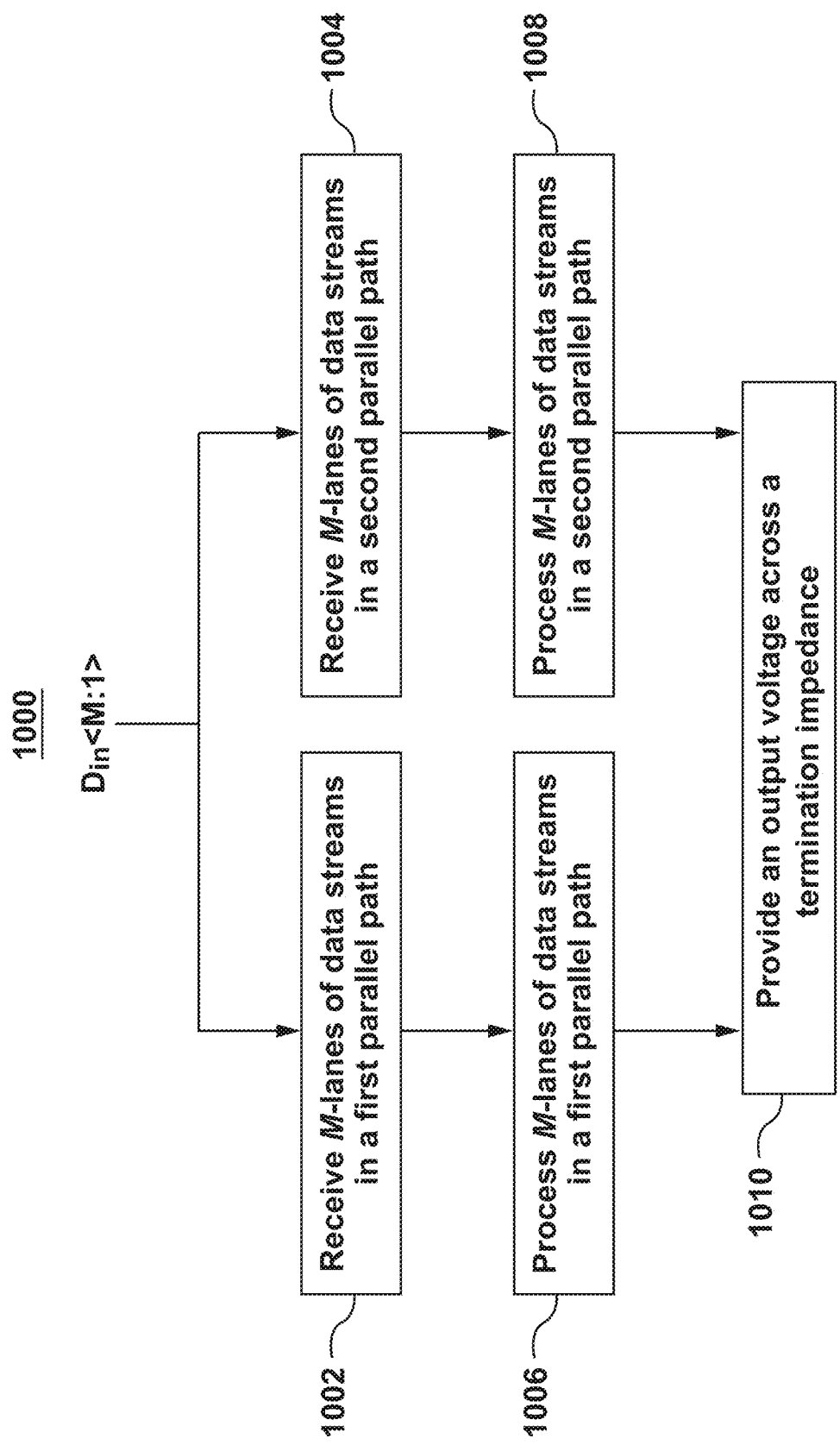
FIG. 10 depicts a functional flow diagram of process directed to multi-level multi-mode transmitter processing, in accordance with various embodiments discussed in the present disclosure.

FIG. 10 depicts a functional flow diagram of process 1000 directed to multi-level multi-mode transmitter processing, in accordance with various embodiments discussed in the present disclosure.

Process 1000 commences at task block 1002, where multi-level multi-mode transmitter 200 configured to receive M-lanes of data stream $D_{in}$ in a first parallel path. As noted above, first parallel path 212a, employing the first pre-driver 202 and the first voltage driver 204, may be configured to receive M-lanes of data stream $D_1$.

Process 1000 proceeds at task block 1004, where multi-level multi-mode transmitter 200 configured to receive M-lanes of data stream $D_{in}$ in a second parallel path. As discussed above, second parallel path 212b, employing the second pre-driver 208a nd the second voltage driver 210, may be configured to receive M-lanes of data stream $D_{in}$.

At task block 1006, multi-level multi-mode transmitter 200 configured to process M-lanes of data stream $D_{in}$ in first parallel path. In so doing, multi-level multi-mode transmitter 200 may convert M-lanes of data stream $D_{in}$ single data stream $d_0$ and generate a voltage at in accordance with data stream $d_0$. As previously discussed, pre-driver 202 is configured to convert M-lanes of data stream into single data stream $d_0$. Further, voltage driver 204 provides a voltage in accordance with data stream $d_0$.

Process 1000 proceeds at task block 1008, where multi-level multi-mode transmitter 200 configured to process M-lanes of data stream $D_{in}$ in second parallel path. In so doing, multi-level multi-mode transmitter 200 process M-lanes of data stream $D_{in}$ in accordance with at least one of the selected mode from moderate Z post-cursor mode, moderate Z pre-cursor mode, low Z high-swing mode, low Z post-cursor mode, and low Z pre-cursor mode. Further, multi-level multi-mode transmitter 200 convert M-lanes of data stream $D_{in}$ into single data stream $d_0$ and generate a voltage at in accordance with data stream $d_0$.

As described above, second pre-driver 208 employing moderate Z post-cursor module 208a, moderate Z pre-cursor module 208b, low Z high-swing module 208c, low Z post-cursor module 208d, and low Z pre-cursor module 208e may be configure to process M-lanes of data stream $D_{in}$ in accordance with a mode selected by selector 208f. Further, M×1 multiplexer 208g may be configured to process M-lanes of data stream $D_{in}$ into single data stream $d_{Op}$ and $d_{On}$. Voltage driver 210 provides a voltage in accordance with data stream $d_{Op}$ and $d_{On}$.

Finally, at task block 1010, multi-level multi-mode transmitter 200 configured to provide an output voltage across termination impedance. As noted above, multi-level multi-mode transmitter 200 provides an output voltage across termination impedance, in accordance with voltages from voltage drivers 204 and 210.

Thus, by virtue of techniques provided by multi-level multi-mode transmitter 200, efficient utilization of available area and power may be achieved, such that efficiency of designing ICs incorporating CMUs and multiple SerDes may be increased through the use of efficient components and design.

It is to be understood that the operations and functionality of the described by multi-level multi-mode transmitter 200, a high output voltage swing, a large pre-cursor and post-cursor boost, resulting in an improved SNR and signal quality. Since, the processing for pre-cursor boost and post-cursor boost is implemented prior to serial conversion of M-lanes of data stream thereby, multi-level multi-mode transmitter 200 may be implemented with simpler hardware constructs operating at normal speeds.

Also, operating multi-level multi-mode transmitter 200 under moderate Z post-cursor module 208a or moderate Z pre-cursor module 208b may preserves the signal amplitude with moderate post/pre cursor boost when compared to operation of conventional multi-lane serial link transmitter 100. Further, Operating multi-level multi-mode transmitter 200 under low Z high-swing module 208c, low Z post-cursor module 208d, or low Z pre-cursor module 208e produces a considerably larger amount of boost to the signal amplitude when compared to operation of conventional multi-lane serial link transmitter 100.

It will further be appreciated that, while the modules and components of multi-level multi-mode transmitter 200 have been described and depicted as discrete elements for simplicity purposes, such modules and components may be utilized in any one or more forms such as shared, combined, and integrated without departing from the disclosed concepts.

It is to be understood that the operations and functionality of the described multi-level multi-mode transmitter 200, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A multi-level multi-mode transmitter, comprising:
a first pre-driver configured to receive M-parallel data streams and to convert the M-parallel data streams into a serial data stream, where M is a positive integer value;
a first voltage-driver configured to operate on the single data stream and to provide a voltage in accordance with the single data stream;
a second pre-driver configured to receive the M-parallel data streams, process the M-parallel data streams in accordance with at least one of the following modes: moderate impedance (Z) post-cursor mode, moderate Z pre-cursor mode, low Z high-swing mode, low Z post-cursor mode, and low Z pre-cursor mode, and convert the processed M-parallel data streams into a first serial stream and a second serial stream; and
a second voltage-driver configured to operate on the first serial stream and the second serial stream and to provide a voltage in accordance with the first serial stream and the second serial stream.

2. The multi-level multi-mode transmitter of claim 1, wherein the first pre-driver and the first voltage-driver are configured to operate in parallel with the second pre-driver and the second voltage-driver.

3. The multi-level multi-mode transmitter of claim 1, wherein the first pre-driver comprises a first tap delay configured to delay the M-parallel data streams.

4. The multi-level multi-mode transmitter of claim 3, wherein the second pre-driver comprises a second tap-delay configured to delay the M-parallel data streams when operating in moderate Z post-cursor mode, and wherein a delay provided by the first tap delay matches to a delay provided by the second tap delay.

5. The multi-level multi-mode transmitter of claim 4, wherein the second pre-driver further comprises a transition detector configured to detect transitions in delayed M-parallel data streams from low-to-high or from high-to low level and a multiplexer configured to provide first M-parallel streams and second M-parallel streams when operating in moderate Z post-cursor mode.

6. The multi-level multi-mode transmitter of claim 3, wherein the second pre-driver comprises a second tap-delay configured to delay the M-parallel data streams when operating in moderate Z pre-cursor mode, and wherein a delay provided by the first tap delay is one unit more than a delay provided by the second tap-delay.

7. The multi-level multi-mode transmitter of claim 6, wherein the second pre-driver further comprises a transition detector configured to detect the transitions in delayed M-parallel data streams from low-to-high or from high-to low level and to provide a M-parallel streams and second M-parallel streams when operating in moderate Z pre-cursor mode.

8. The multi-level multi-mode transmitter of claim 3, wherein the second pre-driver comprises a second tap-delay configured to delay the M-parallel data streams when operating in low Z post-cursor mode, and wherein a delay provided by the first tap delay is one unit less than a delay provided by the second pre-driver.

9. The multi-level multi-mode transmitter of claim 8, wherein in low Z post-cursor mode the second pre-driver further comprises an inverter configured to invert the delayed M-parallel data streams and to provide first M-parallel streams and second M-parallel streams when operating in low Z post-cursor mode.

10. The multi-level multi-mode transmitter of claim 3, wherein the second pre-driver comprises a second tap-delay configured to delay the M-parallel data streams when operating in low Z pre-cursor mode, and wherein a delay provided by the first tap delay is one unit more than a delay provided by the second tap delay.

11. The multi-level multi-mode transmitter of claim 10, wherein the second pre-driver further comprises an inverter configured to invert the delayed M-parallel data streams and to provide first M-parallel streams and second M-parallel streams when operating in low Z pre-cursor mode.

12. The multi-level multi-mode transmitter of claim 1, further comprising a selector configured to cause the second pre driver to process the M-parallel data streams in accordance with the at least one of the following modes: moderate impedance (Z) post-cursor mode, moderate Z pre-cursor mode, low Z high-swing mode, low Z post-cursor mode, and low Z pre-cursor mode.

13. A method of multi-level multi-mode transmitter processing, comprising:
    receiving M-parallel data streams at a first pre-driver, where M is a positive integer value;
    converting, by the first pre-driver, the M-parallel data streams into a serial data stream;
    providing, by a first voltage-driver, a voltage in accordance with the serial data stream;
    receiving the M-parallel data streams at a second pre-driver;
    processing, by second pre-driver, the M-parallel data streams, in accordance with at least one of the following modes: moderate impedance (Z) post-cursor mode, moderate Z pre-cursor mode, low Z high-swing mode, low Z post-cursor mode, and low Z pre-cursor mode;
    converting, by the second pre-driver, the processed M-lanes of data stream into a first serial stream and a second serial stream;
    providing, by a second voltage-driver, a voltage in accordance with the first serial stream and the second serial stream.

14. The method of claim 13, further comprising operating the first pre-driver and the first voltage-driver in parallel with the second pre-driver and the second voltage-driver.

15. The method of claim 13, further comprising delaying the M-parallel data streams by the first pre-driver.

16. The method of claim 15, further comprising delaying the M-parallel data streams when the second pre-driver is in moderate Z post-cursor mode, wherein a delay provided by the first pre-driver matches to a delay provided by the second pre-driver.

17. The method of claim 16, further comprising detecting the transitions in delayed M-parallel data streams from low-to-high or from high-to low level and providing first M-parallel streams and second M-parallel streams when the second pre-driver is in moderate Z post-cursor mode.

18. The method of claim 17, further comprising generating the first serial stream and the second serial stream in accordance with the first M-parallel streams and the second M-parallel streams when the second pre-driver is in moderate Z post-cursor mode.

19. The method of claim 18, further comprising providing post-cursor data interference compensation when the second pre-driver is in moderate Z post-cursor mode.

20. The method of claim 15, further comprising delaying the M-parallel data streams when the second pre-driver is in moderate Z pre-cursor mode, wherein a delay provided by the first pre-driver is one unit more than a delay provided by the second pre-driver.

21. The method of claim 20, further comprising detecting the transitions in delayed M-lanes of data stream from low-to-high or from high-to low level when the second pre-driver is in moderate Z pre-cursor mode and providing first M-parallel streams and second M-parallel streams.

22. The method of claim 21, further comprising generating the first serial stream and the second serial stream in accordance with the first M-parallel streams and the second M-parallel streams when the second pre-driver is in moderate Z pre-cursor mode.

23. The method of claim 22, further comprising providing pre-cursor data interference compensation when the second pre-driver is in moderate Z pre-cursor mode.

24. The method of claim 15, further comprising delaying the M-parallel data streams when the second pre-driver is in low Z post-cursor mode, wherein the delay provided by the first pre-driver is one unit less than the delay provided by the second pre-driver.

25. The method of claim 24, further comprising inverting the delayed M-parallel data streams and provides first M-parallel streams and second M-parallel streams when the second pre-driver is in low Z post-cursor mode.

26. The method of claim 25, wherein the first M-parallel streams and the second M-parallel streams are similar when the second pre-driver is in low Z post-cursor mode.

27. The method of claim 25, further comprising generating the first serial stream and the second serial stream in accordance with the first M-parallel streams and the second M-parallel streams when the second pre-driver is in low Z post-cursor mode.

28. The method of claim 27, further comprising providing a multi-level output voltage when the second pre-driver is in low Z post-cursor mode, wherein a ratio of a higher voltage level to a lower voltage level of a same polarity is at least equal to four.

29. The method of claim 15, further comprising delaying the M-parallel streams when the second pre-driver is in low Z pre-cursor mode, wherein a delay provided by the first pre-driver is one unit more than a delay provided by the second pre-driver.

30. The method of claim 29, further comprising inverting the delayed M-parallel streams and providing first M-parallel streams and second M-parallel streams when the second pre-driver is in low Z pre-cursor mode.

31. The method of claim 30, further comprising generating the first serial stream and the second serial stream in accordance with the first M-parallel streams and the second M-parallel streams when the second pre-driver is in low Z pre-cursor mode.

32. The method of claim 30, wherein the first M-lane of stream and the second M-lane of stream are similar when the second pre-driver is in low Z pre-cursor mode.

33. The method of claim 13, further comprising operating the first pre-driver and the second pre-driver in a similar manner when the second pre-driver is in low Z high-swing mode.

34. The method of claim 13, further comprising providing a higher voltage swing when the second pre-driver is in low Z high-swing mode.

35. The method of claim 13, wherein in low Z high-swing mode, low Z post-cursor mode, or low Z pre-cursor mode the overall impedance of the multi-level multi-mode transmitter is reduced.

36. The method of claim 13, further comprising providing post-cursor data interference compensation when the second pre-driver is in low Z post-cursor mode.

37. The method of claim 13, further comprising providing a multi-level output voltage, wherein the ratio of a higher voltage level to a lower voltage level of a same polarity is greater than one when the second pre-driver is in moderate Z post-cursor mode or moderate Z pre-cursor mode.

38. The method of claim 13, further comprising providing pre-cursor data interference compensation when the second pre-driver is in low Z pre-cursor mode.

39. The method of claim 13, further comprising operating the first voltage driver with same input from the first pre-driver, while operating the second voltage driver with two inputs from the first pre-driver.

* * * * *